US009520953B2

(12) United States Patent
Burchard

(10) Patent No.: US 9,520,953 B2
(45) Date of Patent: Dec. 13, 2016

(54) METHOD AND SENSOR SYSTEM FOR MEASURING THE PROPERTIES OF A TRANSMISSION PATH OF A MEASURING SYSTEM BETWEEN A TRANSMITTER AND A RECEIVER

(71) Applicant: ELMOS SEMICONDUCTOR AG, Dortmund (DE)

(72) Inventor: Bernd Burchard, Essen (DE)

(73) Assignee: Elmos Semiconductor AG, Dortmund (DE)

(*) Notice: Subject to any disclaimer, the term of this patent is extended or adjusted under 35 U.S.C. 154(b) by 159 days.

(21) Appl. No.: 14/466,082

(22) Filed: Aug. 22, 2014

(65) Prior Publication Data
US 2014/0369225 A1 Dec. 18, 2014

Related U.S. Application Data

(63) Continuation of application No. PCT/EP2012/076663, filed on Dec. 21, 2012.

(51) Int. Cl.
*H04B 17/00* (2015.01)
*G01S 7/487* (2006.01)
(Continued)

(52) U.S. Cl.
CPC ......... *H04B 17/0097* (2013.01); *G01S 7/4876* (2013.01); *G01S 7/497* (2013.01);
(Continued)

(58) Field of Classification Search
CPC ..... H04B 17/00; H04B 17/0085; H04B 17/13; H04B 17/14; H04B 17/18; H04B 17/19; H04B 17/24; H04B 17/29; H04B 17/3913; H04J 3/02; H04J 3/14; G01S 7/4876; G01S 17/026; G01S 17/10; G01S 17/46; G01S 7/497
(Continued)

(56) References Cited

U.S. PATENT DOCUMENTS 6,384,379 B1 5/2002 Reime
6,953,926 B2 10/2005 Reime
(Continued)

FOREIGN PATENT DOCUMENTS

DE 9309837 U1 9/1993
DE 198 39 730 C1 3/2000
(Continued)

OTHER PUBLICATIONS

English Translation of the International Preliminary Report on Patentability, PCT/EP2012/076663, Aug. 28, 2014.

*Primary Examiner* — Young T Tse
(74) *Attorney, Agent, or Firm* — Bose McKinney & Evans LLP

(57) ABSTRACT

Method and sensor system for measuring the transmission properties of a first transmission path based on feedback compensation between a first transmitter and a receiver, a compensation signal of a compensation transmitter being received in a superimposed manner in the receiver in addition to the emitted transmission signal of the first transmitter. A supply signal for the first transmitter and a receiver output signal each form a vector in a pre-Hilbert space. A Hilbert projection is performed between the receiver output signal and the supply signal so that a projection image signal is generated. An output signal is formed from the projection image signal. A pre-signal is generated by an inverse transformation of the output signal with the supply signal. A compensation signal for supplying the compensation transmitter is generated from the pre-signal formed in order to achieve feedback control of the receiver output signal.

31 Claims, 28 Drawing Sheets

(51) Int. Cl.
  *G01S 7/497* (2006.01)
  *G01S 17/02* (2006.01)
  *G01S 17/10* (2006.01)
  *G01S 17/46* (2006.01)
  *H04J 3/14* (2006.01)
  *H04B 17/14* (2015.01)
  *H04B 17/24* (2015.01)
  *H04B 17/391* (2015.01)

(52) U.S. Cl.
  CPC ............ *G01S 17/026* (2013.01); *G01S 17/10* (2013.01); *G01S 17/46* (2013.01); *H04B 17/14* (2015.01); *H04B 17/24* (2015.01); *H04B 17/3913* (2015.01); *H04J 3/14* (2013.01)

(58) Field of Classification Search
  USPC .......... 375/224, 219, 222, 259; 455/39, 500, 455/501, 504, 67.11, 67.13, 67.14, 68, 69, 455/70, 73, 84, 88
  See application file for complete search history.

(56) References Cited

U.S. PATENT DOCUMENTS

| | | |
|---|---|---|
| 6,965,327 B2 | 11/2005 | Reime |
| 7,378,641 B2 | 5/2008 | Melcher et al. |
| 7,589,303 B2 | 9/2009 | Reime et al. |
| 8,405,821 B2 | 3/2013 | Reime |
| 2003/0020004 A1 | 1/2003 | Reime |
| 2007/0053688 A1* | 3/2007 | Benz .................... H04B 10/077 398/27 |
| 2007/0177877 A1* | 8/2007 | Sekine ............ H04B 10/25133 398/147 |
| 2009/0034651 A1* | 2/2009 | Lan ...................... H04L 25/061 375/296 |
| 2010/0098423 A1* | 4/2010 | Kunimatsu ...... H04B 10/07955 398/81 |

FOREIGN PATENT DOCUMENTS

| | | |
|---|---|---|
| DE | 100 01 943 A1 | 7/2001 |
| DE | 100 01 955 A1 | 7/2001 |
| DE | 100 24 156 A1 | 11/2001 |
| DE | 103 46 741 B3 | 3/2005 |
| DE | 10 2004 025 345 B3 | 11/2005 |
| DE | 10 2005 010 745 B3 | 4/2006 |
| DE | 10 2005 013 325 A1 | 10/2006 |
| DE | 10 2005 013 352 A1 | 10/2006 |
| DE | 10 2007 005 187 B4 | 11/2008 |
| DE | 10 2007 048 402 A1 | 4/2009 |
| DE | 10 2010 028 967 A1 | 10/2011 |
| EP | 2 159 600 A1 | 3/2010 |

\* cited by examiner

METHOD AND SENSOR SYSTEM FOR MEASURING THE PROPERTIES OF A TRANSMISSION PATH OF A MEASURING SYSTEM BETWEEN A TRANSMITTER AND A RECEIVER

RELATED APPLICATIONS

This application is a continuation of PCT/EP2012/076663, filed Dec. 21, 2012, which claims priority to EP 12 156 720.0, filed Feb. 23, 2012, both of which are hereby incorporated herein by reference in their entireties.

BACKGROUND

The present invention relates to a method and to a sensor system for measuring the transmission properties of a first transmission path between a first transmitter and a receiver. The first transmitter transmits a first signal onto the transmission path that is detected by the receiver after passing through at least a portion of the first transmission path. A second transmitter transmits a second signal onto a second transmission path that is detected by the receiver after passing through the second transmission path. In the receiver, the first signal and the second signal are superimposed in a substantially cumulative manner. A receiver output signal is then formed therefrom, processed further, and finally fed to the second transmitter in a feedback loop for compensation.

In many areas of application, the transmission properties of a transmission path from a transmitter to a receiver, for example a sensor, are to be determined. It can be necessary, for example, to determine the distance of a reference object to another object or to detect the movement of an object in a certain area or space. Other examples are the determination of fundamental properties of the medium of the transmission path such as, for example, refractive index, absorption spectra, dispersion, scattering (e.g., fog detection), spin relaxation times, electromagnetic constants such as permittivity, relative permeability and light velocity, fluorescence characteristics (transmission of carrier wavelength and/or carrier frequency of a signal to another wavelength/frequency) or the detection of the properties of boundary layers and surfaces such as reflectivity, reflection spectrum, ratio of the abovementioned properties between the media of the boundary surface, spacing of the boundary surface, etc.

Numerous compensating methods are known from the prior art in which the actual transmission signal is superimposed with a compensating signal at the receiver in such a way that the receiver contains a nearly constant signal in sum. Such a compensating method of measurement is disclosed, for example, in the following documents:

DE 10001955A1
DE 10024156A1
DE 19839730C1
DE 930983U1
DE 10001943C1
DE 10346741B3
DE 102004025345B3
DE 102005013325A1
DE 102005010745B3
DE 102007005187B4

The methods described in these documents use an amplitude-regulated analog signal as a transmission signal and/or as a compensation signal. The transmission signal has a constant duty cycle and as a rule is substantially monofrequent, that is, it uses only one specific frequency.

The monofrequent, analog compensation signal turns out to be a substantial drawback in these methods, because the monofrequent compensation signal is very susceptible to interference. For example, it has been found that, in optical systems, while there is no interference from more or less uniform sunlight, light from light sources such as fluorescent tubes and transients thereof that fluctuates in multiples of the line frequency of 50 Hz or 60 Hz of the respective regional line frequency does indeed cause interference. The problem is exacerbated all the more when several of the measuring systems described therein cannot be optically separated. This can be the case, for example, in an optical automobile radar based on one of the above disclosures if the transmitter of an oncoming automobile transmits into the receiver of one's own automobile. The above systems are not usable for this purpose.

The systems are therefore not readily suitable for triangulation and more complex recognition tasks using several systems.

It also becomes difficult to use such systems if several transmission paths or a larger range are to be detected or monitored. A time division multiplex method is then generally used in order to differentiate the individual signals in time. However, this has the drawback that delays occur during the processing of the signals and observation of the desired range. Time-gaps arise in the spatial observation that are not acceptable, particularly in security-related applications.

Another drawback of the systems from the above list that perform gap detection is that they are only capable of determining the average gap between the reflectors when several reflectors are used.

SUMMARY

This disclosure teaches an optimized method for detecting the transmission properties of a transmission path which is such that, for example, an object present in the transmission path and/or important characteristics of this object can be reliably identified. The method is particularly compensation-based and generally insensitive to interference.

Description of the Underlying System and the Underlying Mathematical Methods

A first transmission path of a measuring system is formed between a first transmitter H1 and a receiver D1. The first transmitter H1 transmits a first signal onto the first transmission path so that, after passing through at least a portion of the first transmission path, this signal is detected at the receiver D1. A second transmitter K, which is a so-called compensation transmitter, transmits a second signal onto a second transmission path that exists between the second transmitter K and the receiver D1. The second signal (compensation transmission signal) is detected by the receiver D1 after passing through the second transmission path. In the receiver D1, the first signal and the second signal are superimposed in a substantially linear manner. The superimposition is preferably cumulative. In the receiver, a receiver output signal is formed from the two superimposed signals.

To measure the transmission properties of the first transmission path between the first transmitter H1 and the receiver D1, a first supply signal S5 is produced by means of a generator. The supply signal S5 and the receiver output signal S1 are selected such that each of the two signals forms a vector in a pre-Hilbert space. A more precise definition of the pre-Hilbert space as used in the present context will be provided below. The associated mathematical relationships are described, for example, in "Taschenbuch der Mathematik" [Handbook of Mathematics]; I. N. Bronstein, K. A. Semendjajew. G. Musiol, H. Mühlig; 6th edition; Frankfurt am Main; published by Harri Deutsch; 2005; section 12.4 "Hilbert Spaces," page 635 et seqq. In places in which reference is made to this book, it is referred to as BRONSTEIN.

The signals to be transmitted are formed by functions of time; in the simplest case, for example, they are formed by a sine or cosine function. The same applies to the receiver output signal S1. This means that the signals determined to be vectors (supply signal S5, with which the first transmitter is supplied, and receiver output signal S1) are elements of a vector space in which an inner product is defined. In other words, the two signals S5, S1 are elements of a vector space in which a scalar product is defined in order to be able to describe the relationship between the vectors. (BRONSTEIN section 12.4.1.1).

To facilitate understanding, some general remarks will be made on the background.

A signal S(t) can be represented as a vector S. In doing so, the signal S(t) consists of an infinite number of signal values $S_i$, the signal samples, with the index i representing a point in time $t_i$ at which the signal S(t) had this value $S_i$. These infinite values $S_i$ therefore constitute an infinite dimensional vector S. Since such a value $S_t=S(t)$ can be determined for each point in time t, the gap between the values $S_i$ and $S_{i+1}$ can be reduced to zero. S(t) can therefore be regarded as an infinite dimensional vector, with the parameter t corresponding to the original index i of the values $S_i$ of the vector S.

If one now considers two signals A(t) and B(t), one would write the following for the scalar product of vectors A and B of sample signals $A_i$ and $B_i$:

$$\langle A, B \rangle = \sum_{i=-\infty}^{\infty} A_i B_i$$

This scalar product can be used as a part of the definition of a Hilbert space.

This yields a single value without a vector characteristic, a scalar that corresponds to the projection of one vector, such as vector A, to the other vector, such as vector B.

If one now considers the associated time-continuous signals A(t) and B(t), then the associated scalar product can be defined as follows, for example:

$$\langle A(t), B(t) \rangle = \int_{-\infty}^{\infty} A(t)B(t)dt$$

Here, the time-continuous signals A(t) and B(t) are regarded as vectors of a Hilbert space as described above, wherein the above integral assumes the role of the corresponding scalar product of this vector space and replaces the sum of the preceding equation.

However, scalar products need not necessarily be integrals. The scalar product need only be defined such that a Hilbert space is formed. For example, it can be a linear filtration F[ ] of the product of the signals A(t) and B(t):

$$\langle A(t), B(t) \rangle = F[A(t)B(t)]$$

Two signals A(t), B(t) are orthogonal is their scalar product yields zero:

$$\langle A(t), B(t) \rangle = 0$$

An orthogonal base signal set is a set of signals $B_i(t)$, wherein i represents an index and the following holds true:

$$\langle B_i(t), B_j(t) \rangle = 0$$

for $i \neq j$

The set of base signals $B_i(t)$ is complete if there can be no additional signal C(t) different from zero in which the following applies for all $B_i(t)$:

$$\langle B_i(t), C(t) \rangle = 0$$

If the base signal set is incomplete, then one speaks of a pre-Hilbert space.

If signal C(t) is to be transformed into a Hilbert space with base signal set $B_i(t)$, a coefficient $c_i$ is formed for every possible scalar product from the signal C(t) and a base signal $B_i(t)$:

$$\langle B_i(t), C(t) \rangle = c_i$$

For the sake of completeness, it should be mentioned that the base signals $B_i(t)$ are expediently frequently selected in terms of their amplitude such that their norm is equal to 1:

$$\langle B_i(t), B_i(t) \rangle = 1$$

To recover the original signal C(t) from the vector c of the $c_i$ coefficients, this can be achieved using the simple inverse transformation:

$$C(t) = \sum_{i=1}^{\infty} c_i B_i(t).$$

This method can be used in order to project, from a signal S1(t), the component $S1_{S5}(t)$ that is proportional to a signal S5. For this purpose, transformation and inverse transformation are performed only for this signal S5. In doing so, it is assumed that the norm of the signal S5 is equal to 1. The following applies:

$$S1_{S5} = S5 \langle S5, S1 \rangle$$

If the scalar product is performed by multiplying the signals S1 and S5, then filtering through a filter F, then one can write:

$$S1_{S5} = S5 * F[S5 * S1]$$

The filter F therefore carries out, together with the preceding signal multiplication, a transformation of the signal S1 to the base signal S5. One also speaks of a Hilbert projection of the signal S1 to the signal S5, while the subsequent second multiplication corresponds to an inverse transformation. Since the signal S5 alone cannot constitute a base signal set for all conceivable signals, the result $S1_{S5}(t)$ of the successive forward transformation and inverse transformation of the signal S1 into the S5 space deviates from the input signal S1. Therefore, the signal S1 is ultimately filtered.

As a result of the transmission, the passing through the transmission path, superimposition with the signal of the compensation transmitter K and the subsequent reception, the supply signal S5 is modified into the receiver output signal S1. The signal S1 then contains components of the supply signal S5 and components that originate from distortions and other modifications. The components that correspond to the supply signal S5 are separated out first.

In another method step, a forward transformation is therefore carried out through a Hilbert projection of the receiver output signal of the receiver S1 to the supply signal of the first transmitter S5. The Hilbert projection is a special type of transformation in which only one single-column matrix is multiplied by a vector, thus forming a scalar. The Hilbert projection (BRONSTEIN section 12.4.2) can be done in such a way that the receiver output signal is projected onto the first supply signal or, alternatively, that the supply signal is projected on the receiver output signal of the receiver. In real functions, both procedures lead to the same results. In more complex functions, the type of projection must be selected based on the application. A system simulation should be performed here. A projection image signal is therefore produced using a Hilbert projection.

Technically speaking, the execution of the Hilbert projection means detecting how much of the signal component in the receiver output S1 is based on the supply signal S5. Besides the supply signal component and the component from the second transmitter (compensation transmitter) K, the receiver output signal contains, for example, signal components of interferers (z. B. J1) that influence the transmission path. Since the Hilbert projection is not performed with a complete, orthogonal base signal set, but rather only with the supply signal S5 here, one initially obtains only a single coefficient signal that only describes this component, and not a complete set of coefficient signals that would enable reconstruction of the receiver output signal S1. Therefore, only the component of the receiver output signal S1 is further processed that correlates to the supply signal S5. The components of the receiver output signal S1 not corresponding to the supply signal S5 are therefore omitted. In this way, filtering is performed that only lets the transmitted supply signal through.

The projection image signal S10 resulting from the Hilbert projection is further processed into an output signal S4. Preferably, the further processing is performed through amplification of the projection image signal S10 by means of an amplifier V1. The amplification can be equal to one or, depending on the application, for example, it can also be negative.

On the one hand, the output signal S4 is further processed in order to become a pre-signal S6 after an at least partial inverse transformation of the output signal with the first supply signal S5. From the pre-signal S6, the compensation signal S3 is then generated with which the second transmitter, which is the compensation transmitter K, is supplied. This results in a feedback control of the receiver output signal S1. The compensation signal S3 can be identical to the pre-signal S6. Amplification and sign of the amplification of the amplifier V1 are typically selected such that the feedback control system does not oscillate and the output signal S4 converges.

The output signal S4 contains the desired information about the first transmission path, whose transmission properties are measured with the method according to this disclosure. From the output signal S4, it is possible to make inferences about the transmission path, its properties or objects within the transmission path and to determine, for example, the position or movement of an object. The output signal S4 is preferably taken from the system as a measurement result and further processed externally. In particular, it contains the amplitude information that is required for the compensation of changes (e.g., attenuation) in the transmission path.

The method is also suitable for determining a delay. For clarification, it will be assumed for the sake of simplicity that the signal S1 represents an unattenuated but time-delayed version of a transmission signal S5. This means that the scalar product $<S1, S5>$ is reduced compared to a case in which S1 were not delayed with respect to S5. If the base signal set of the system were complete, then the scalar product of at least one other base signal would instead be increased in value with signal S1. For example, if S5 were a sine signal, for example, the scalar product of the associated cosine signal would be increased by a delay. In order to determine the delay, it is therefore only necessary to add such base signals and the associated forward and inverse transformations to the incomplete base signal set consisting only of the signal S5 that are able to form a scalar product different from zero with the received signal S1, which is ultimately to say a delayed transmission signal S5. The value of the scalar products of these supplemented signals is then one possible measure for the delay.

Properties of the Supply Signal

Unlike the prior art, the supply signal S5 of nearly any band-limited signal different from zero can be used to carry out the method according to this disclosure. Unlike the prior art, which requires a monofrequent signal, the supply signal S5 is generally a multifrequent signal; it therefore contains several different frequency components and several different frequencies at the same time. The band-limited supply signal has an upper and lower band frequency. It has an upper cutoff frequency $\omega_{max}$ and a lower cutoff frequency $\omega_{min}$ that are different from each other. From these, one obtains the bandwidth $\omega_{Band}$ of the supply signal S5:

$$\omega_{Band} = \omega_{max} - \omega_{min}$$

The supply signal is preferably selected such that the lower cutoff frequency $\omega_{min}$ is greater than half the bandwidth $\omega_{Band}$. Preferably, it is a non-clocked, band-limited signal.

In another embodiment, the supply signal can be a modulated signal or a non-clocked signal such as, for example, a random signal and/or a pseudo-random signal. It is also possible to process a signal that is based on a spread code. Noise signals, such as a white, band-limited noise, are also suitable as supply signal S5.

In another embodiment of the method, the Hilbert projection is performed through formation of a scalar product. Since both the supply signal S5 and the receiver output signal S1 vectors are in a pre-Hilbert space, a scalar product is defined between them. A scalar multiplication or scalar product formation can be performed in a technical simple manner: Preferably, it is done by multiplication of the receiver output signal S1 and the supply signal, thus forming a so-called detection signal S9, and by subsequent filtering (typically integration).

Properties of the Filter

The subsequent filtering of the detection signal S9 with a filter F1, which is also preferably band-limited, produces a filtered filter output signal that is the projection image signal S10.

In a preferred embodiment, a linear filter F1 is used that preferably allows only such frequency components to pass through whose frequency is less than or equal to half of the distance between the upper cutoff frequency $\omega_{max}$ and the lower cutoff frequency $\omega_{min}$ of the band-limited supply signal S5.

Suppression of Interferers

Through application of the method according to this disclosure by means of compensation through transmission and transfer of a feedback compensation transmission signal S3 to the receiver D1, the method can also be applied if interferers (e.g., J1) are present in the transmission path. Interferers are frequently narrow-band, which is typically true of the artificial (man-made) interferers. In comparison to that, the supply signal S5 is generally selected so as to be broadband. As a result of the multiplication, the component of the supply signal S5 in the spectrum of the resulting signal S9 is relatively narrow-band, whereas the interference signal is typically spread and shifted into frequencies above the filter cutoff frequency. The interference signal components are reduced in amplitude with respect to a frequency in the spectrum of the detection signal S9 and simultaneously broadband with respect to their overall proportion in the spectrum of the detection signal S9. The filter F1 for the subsequent filtering is adapted in such a way to the established and known supply signal S5 that precisely those components of the receiver output signal that are based on the supply signal S5 are able to pass through the filter. All other signal components are filtered out or sufficiently reduced in amplitude in accordance with the aim.

As a result of this spreading method, the interferers are forced into the noise background. This renders the method substantially less sensitive to interference overall than the methods of the prior art. Particularly, it is capable of functioning even if the interference levels lie above the signal levels of the supply signal or of the transmission signal transmitted by the first transmitter. In simulations, it can be shown that, with a proper system design, interferers that do not lie at a multiple of the frequencies used in the supply signal S5 can have a signal-to-noise ratio of −12 dB. This is because, due to redundancy, the broad spectrum of the supply signal ensures a good recognition value of the signal S5 in the receiver output signal S1 even if portions of the signal are already no longer usable. The method makes very good decoupling possible. For this reason, in contrast to the prior art, it is also possible to operate two or more simultaneously functioning compensation-based systems if their supply signals S5 are orthogonal to each other with respect to the scalar products used. These systems would interfere with each other without implementation of the method according to this disclosure. However, decoupling by means of supply signal orthogonality makes interference-free operation possible.

Optimal Selection of the Supply Signal

In an embodiment of the method according to this disclosure, an interference signal is first identified in the receiver output signal. This occurs when an interfering transmitter influences the transmission path between the first transmitter and the receiver. In order to identify such an interference signal, the filter, which is preferably used for the Hilbert projection, is measured.

The measurement is explained in relation to the exemplary determination of an optimal digital spread code as the basis of the supply signal S5. The latter should have a maximum signal-to-noise ratio to interferers present in the transmission path. This ensures that the transmission signal S5 has a maximum signal-to-noise ratio to the interference signal. The supply signal S5 is now perceived as a quasi-infinite consequence of one or more codes. In the simplest of cases, a code is permanently repeated.

Each of these equally long codes consists of a sequence of n bits in which the supply signal S5 is switched, for example, to a physical level that corresponds to a logical 1 or to a physical level that corresponds to a logical 0. This n bit sequence is repeatedly transmitted, for example, in a quasi-never-ending loop, thus producing the base signal S5. With a code length of n bits, $2^n$ potential codes are therefore possible for generating an S5 signal. At least one of these codes has a maximum signal-to-noise ratio to the potential interferers.

The first transmitter H1 is now supplied with a known, particularly constant supply signal S5. The supply signal S5 is preferably equal to 1. This can be done, for example, by transmitting a binary code sequence that represents a 1. A code that is inverse thereto represents a zero.

Since the method according to this disclosure is based on a signal estimation algorithm, a logical 1 is applied to the transmitter during the initial phase of the method. The signal estimator now allocates to each received code a code from the quantity of $2^n$ potential codes. As a result, the likelihood of this code being mistakenly received during normal operation increases. For each of the possible $2^n$ codes, the frequency of occurrence is recorded by a processing unit connected downstream from the receiver. This processing unit with signal estimator downstream from the receiver thus measures the environment and establishes a reception probability in the manner described above for each of the possible codes and temporarily stores these in an interference table. For example, the two inverse code pairs from the interference table are now used to generate the supply signal S5 that, as a pair, have the highest frequency and hence the maximum signal-to-noise ratio.

One element of the code pair selected in this way is defined as a zero-code, and the other as a one-code. As will readily be understood, polyvalent codes are also possible instead of the binary code described here.

The transmitter can now transmit, for example, an alternating sequence of zero-codes and one-codes but also a random sequence, which must have at least one state change within a certain time segment. Typically, the code sequence is selected such that it has no bias value.

Naturally, in the simplest of cases, a one-code can also consist of a single 1-bit and the corresponding zero-code of a single 0-bit. The code length is then 1.

The transmitter H1 now transmits the previously established code sequence of the signal S5. The compensation transmitter (second transmitter) K transmits a compensating signal that is typically the inverse code sequence. The compensation transmitter K generally transmits directly or at least in a known manner into the receiver, whereas the transmission signal of the first transmitter H1 on the transmission path to the receiver D1 is influenced by an object of measurement or an interferer. This influence can, for example, be a reflection, and change of transmission properties or a change in the transmission path, e.g., a change in the dielectric constant or in the relative permeability or, more generally, in the refractive index. The second transmission path between the compensation transmitter and the receiver can also be influenced. All that is important here is that a different influence occur than in the first transmission path. The influencing of the second transmission path should be known. Ideally, the second transmission path is not influenced by the object of measurement or an interferer.

The signal estimator in the processing unit performs a correlation with the codes and determines the most likely code and the probability with which the transmitted code was actually detected. The actually detected codes are classified as disrupted codes if they do not match the transmitted code and the Hamming distance exceeds a minimum value (e.g., 1). The previously stored interference table is thus adapted to the current state. During the next transmission process, a code pair with the lowest interference probability is thus selected by the generator. This method also ensures, for example, that two systems working in parallel that make use of the method according to this disclosure can be adjusted such that the systems do not influence each other and their codes are therefore as orthogonal to each other as possible.

The control algorithm of the method according to this disclosure works in such a way that the transmission power of the compensation transmitter K is regulated such that the probability of detection of the transmitted code or of the inverted transmitted code by the receiver is minimized. If the inverted code is detected, then the compensation transmitter is set too high. If only the transmitted code is detected, then the compensation transmitter K is set too low. The level at which the compensation transmitter K is set is the measured value of the transmission path.

Since it is possible, through appropriate selection of the transmission signals S5, for example in the form of codes as described here, to operate two sensor systems that function according to the method of this disclosure in parallel, it is also possible to have several transmitters and several receivers operate simultaneously. For example, it is possible construct systems that have two transmitters and one receiver or systems that have two receivers and one transmitter. However, since the transmitting side of the system is simpler and more cost-effective to implement, it is expedient to use only one receiver.

Through the use of several transmitters and/or receivers, three-dimensional triangulation is also possible, for example. Three transmission systems (each consisting of (code) generator and transmitter) are used in order to enable three-dimensional detection.

Description of the Triangulation Problem

In order to detect one or more objects in the transmission path, and not only their presence but also their position or movement, it is appropriate to use a two-dimensional (particularly asynchronous) estimator that performs a determination of the amplitude and delay. This can be achieved, for example, by a correlator. The correlation function between a multifrequent transmission signal, for example any multifrequent code sequence, and a received signal, for example a likewise multifrequent code sequence, is used to calculate a second (encoded) signal (compensation signal). For code sequences, the sequence of the first generator is inverted for this purpose and multiplied by the amplified correlation function of the receiver. Upon transmission through the compensation transmitter K, the code sequence obtained in this way leads to a cancellation of the sum of the reflected signals at the receiver D1 if no delay in the transmission channel of the signal of the first transmitter occurs as a result of time delay effects. The amplified correlation signal is the measured value that expresses, for example, the reflectivity of an object in the transmission channel of the first transmitter.

A delay in the transmission channel leads to a delayed signal containing code components that correspond to a code that is typically shifted by one bit. For example, the delayed signal of the code bit sequence 010110 then contains components of the code 001011. Such a code is referred to in the following as a delayed code.

The control algorithm of the method according to this disclosure for determining distance in addition to determining reflectivity works in such a way that the transmission power of the compensation transmitter K is controlled such that the probability of the detection of the delayed code or of the inverted transmitted code by the receiver is minimized. If the inverted code of the delayed code is detected, then the compensation transmitter is set too high for this delayed code. If only the delayed code is detected, then the compensation transmitter K is set too low for this code.

In order to determine the proportion of the delayed code in the receiver signal, a delayed supply signal is correlated with the output signal of the receiver. A delayed supply signal is a supply signal based on the delayed code. The correlation signal obtained in this way is amplified and multiplied by the inverse code of the delayed code. When transmitted by the compensation transmitter K together with the previously determined code sequence for the non-delayed code, the additional code sequence obtained in this way leads to a cancellation of the sum of the reflected signals at the receiver.

The level at which the compensation transmitter K is set for this code sequence is the measured value of the delay in the transmission path.

The problem arises here that the delayed code must not correlate with the non-delayed code in the correlation method that is respectively applied. If the correlation method is the formation of a scalar product, then this means that code and delayed code must be orthogonal to each other so that the two measured values are independent of each other. If that is not the case, however, and the measure of the correlation of the codes among each other is known, orthogonality can be restored through a simple matrix multiplication. In the following sections, a method will therefore also be described that enables measurement of delay independently of the code used.

The correlation functions determined in this way therefore express the position of the objects. Therefore, the immediate and hence simultaneous detection of an object and its position (as a distance) in the transmission path is possible with only one transmission system consisting of transmitter, compensation transmitter and receiver.

Differences from the Prior Art in Relation to Time Delay Measurement

The method according to this disclosure therefore distinguishes itself from the known detection methods with compensation, since they always require monofrequent, clocked signals that have a duty cycle of 50% and are therefore sensitive to interference and not readily capable of triangulation.

The systems known from the prior art for measuring time delay require a phase-shifter that can also only be used with these monofrequent signals. However, such known systems are especially unsuitable for several signals with several frequencies or for signals with different duty cycles, since the phase-shifter leads to a distortion of the multifrequent signals, and a delay of the signals is only identical in monofrequent signals with a single concrete phase difference. But it is precisely this delay that is supposed to be compensated, which is not possible for devices according to the prior art. The method according to this disclosure overcomes these drawbacks, however, and enables the use of multifrequent signals and hence the transmission of redundant information, which significantly reduces the susceptibility to interference.

Measurement of Time Delay Through Evaluation of the Signal Edges

Besides measurement using codes, object detection can also be performed on the basis of signal edges. This will be explained below using an example:

With the method according to this disclosure, in order to detect an object positioned in the transmission path that is influencing the transmission properties of the transmission path, a measurement of the amplitude is not sufficient, particularly if the distance between the reflecting object and the transmitter is to be determined. This is due to the fact that the reflection coefficient of the object is generally unknown. As above, the delay that is caused by the object must therefore be determined. For this reason, in addition to the supply signal for the first transmitter, an additional signal that is delayed by a predetermined time period Δt is formed. As described above, the delayed signal would be sufficient in order to detect the delay of the signal reflected by the object and thus to make inferences as to the position and/or movement of an object.

As already indicated, it was recognized in relation to this disclosure that the processing of such a delayed signal is technically difficult, since this signal is not necessarily orthogonal to the supply signal. The determination of the filter F1, with which the Hilbert projection is technically implemented, is crucial in the application of the method according to this disclosure. It can be shown that, for an ideal transmission path between the transmitter H1 and receiver D1, and with a band-limited supply signal S5 and a linear filter F1, the signal with the amplitude information is proportional to the attenuation of the transmission path. This is especially true if an amplifier V1 is additionally used in the control loop after the filter F1, since in practice the amplifier has large amplification factors for keeping the control error sufficiently small, thus suppressing nonlinearities and parasitic influences of the transmission system through ample feedback.

It can be shown that, in the presence of an interferer J1 in the transmission channel, the function of the filter F1 is only perfectly proportional to the attenuation of the transmission path if the interferer J1 does not have any components that are synchronous with the supply signal S5 of the first transmitter H1. The proportion of the interferer J1 that is synchronous with the supply signal of the first transmitter S5 can no longer be differentiated from the supply signal S5 itself. The measurement signal S4 (received signal of the receiver or its output signal) is therefore distorted. For this reason, it is important that the supply signal of the transmitter S5 and the filter function of the filter F1 be selected such that the filter output signal S10 is minimal for the supply signal S5 multiplied by the interference signal. This is tantamount to a requirement of orthogonality between the interference signal and the supply signal. This can be achieved particularly if the properties of the interferer and hence of the signal components of the interferer in the receiver output signal S1 are known, for example because the process causing the interference signal is known, like in the case of thermal noise, for instance.

The system can be similarly optimized as previously described for the transmission of codes. For this purpose, the supply signal S5 is set equal to 1 only for this determination, and the system is measured. The system now receives a sequence predetermined by the interferer. If several templates exist of supply signals that are available for transmission as supply signals, then, for the next transmission by means of the first transmitter, the template is selected whose filter function F1 is the lowest among all possible templates after multiplication of the supply signal by the interference sequence.

As previously mentioned, it was recognized in relation to this disclosure that the use of a signal S5$d$ that is delayed compared to the supply signal S5 is technically difficult during processing if the delayed signal S5$d$ is not orthogonal to the supply signal S5. In the case of codes, this was ensured by the requirement that the delayed code should be orthogonal to the non-delayed code. If orthogonality is not present, the filter function is no longer proportional to the attenuation of the transmission path. For this reason, in one preferred embodiment of the method according to this disclosure, as previously indicated in relation to the use of codes, an orthogonal base signal S5$o$ is formed that is orthogonal to the supply signal of the generator S5 with which the first transmitter is supplied. This orthogonal signal S5$o$ is used, for example, in order to determine the position of an object in space.

For example, an orthogonal supply signal S5$o$ can therefore generally cannot from the difference of a signal S5$v$ preceding the supply signal S5 and a trailing signal S5$d$. The preceding signal S5$v$ is shifted forward by a time period Δt with respect to the supply signal S5, while the trailing signal S5$d$ is delayed by this time period Δt. It is assumed here that the median of the signal S5 is equal to zero.

Alternatively, the orthogonal supply signal S5$o$ is formed from the difference of the supply signal S5 and a signal S5$d$ delayed by the time period Δt. In that case, however, the supply signal S5 can no longer be used for the Hilbert projection for amplitude control. Rather, only the differential signal S5-S5$o$ can be used.

Preferably, this orthogonal supply signal S5$o$ is used in the method, with the scalar product being formed between S5$o$ and the receiver output signal S1 after generation of the orthogonal signal S5$o$, so that an orthogonal projection image signal S10$o$ is produced. This is formed in addition to the projection image signal S10, which is based on the supply signal S5 or on the difference between supply signal S5 and orthogonal supply signal S5$o$. In another step, an optional amplification of the orthogonal projection image signal S10$o$ is performed by means of an amplifier to the signal S4$o$. The output signal S4$o$ formed in this way is projected back in another step, and it is multiplied by the orthogonal supply signal S5$o$. The orthogonal pre-signal S6$o$ occurring in this way is added to the pre-signal S6 that was formed by multiplication of the supply signal S5 by the output signal S4 or by multiplication of the differential signal S5-S5$o$ by the output signal S4. Through addition of the pre-signal S6, the orthogonal pre-signal S6$o$ and, optionally, an optional bias value B1, the compensation signal S3 is generated with which the compensation transmitter K is supplied.

Preferably, during the formation of the scalar product between the receiver output signal S1 and the orthogonal supply signal S5$o$ as well, the two signals are multiplied and subsequently filtered by means of a second filter F2. This filter is different from the first filter F1 with which the projection image signal based on the supply signal is filtered. Typically, however, it has the same parameters.

If an object is located in the transmission path, the reflection of the transmission signal by the object produces a component in the signal S1 that correlates with S5$o$. The correlation is stronger and hence the level of the signal S4$o$ is higher if the object is closer to the receiver-transmitter pair and lower if it is located farther away.

Spatial Resolution of Several Objects with the Aid of a Displaceable Zone

The ability to detect several objects that are separated from each other is sometimes required. In order to enable the resolution of several objects and the detection thereof in space, not only one orthogonal signal is used, but rather preferably several orthogonal signals, for example two. These are structured, for example, such that they correspond on the basis of successive chronological regions and successive spatial regions in which an object can be located. For example, three such orthogonal base signals S5$o$1, S5$o$2 and S5$o$3 can be formed from three signals trailing the supply signal S5, i.e., delayed signals S5d1, S5d2, S5d3. In particular, the orthogonal base signals S5o1, S5o2, S5o3 formed from these signals are typically generated as pulses trailing an S5 edge. The delay periods of the individual signals can be different here. Expediently, however, the signals are not necessarily also mutually orthogonal.

A signal S5d1 that is delayed with respect to the supply signal S5 by a first time period $\Delta t1$, a signal S5d2 delayed by a second time period $\Delta t2$, and a signal S5d3 delayed by a third time period $\Delta t3$ are preferably formed for this purpose from the supply signal S5. The second delay time period $\Delta t2$ is greater than the first time period $\Delta t1$. The third time period $\Delta t3$ is greater than or equal to the second time period $\Delta t2$. In another step, a first base signal S5o1 is formed from supply signal S5 and the signal S5d1, for example through the difference of the two signals S5 and S5d1. In addition to this base signal S5o1, a second base signal S5o2 orthogonal thereto is produced, the orthogonal base signal S5o2 preferably being formed from the difference of the first delayed signal S5d1 minus the second delayed signal S5d2. In addition to the base signals S5o1 and S5o2, a third base signal S5o3 orthogonal thereto is produced, the orthogonal base signal S5o3 preferably being formed from the difference of the second delayed signal S5d2 minus the third delayed signal S5d3. The third orthogonal base signal S5o3 can be omitted if $\Delta t3$ is equal to the second time period $\Delta t2$. The first delay period $\Delta t1$ can also be zero. The three orthogonal base signals S5o1, S5o2 and S5o3 are thus respectively formed from the first supply signal S5 and the three trailing signals S5d1, S5d2 and S5d3 orthogonal thereto through application of the above-described method steps. These are not orthogonal to the supply signal S5, however. Therefore, an orthogonal signal S5o is produced by subtraction of the signals S5o1, S5o2 and S5o3 from the signal S5. From the three orthogonal base signals S5o1, S5o2 and S5o5 and the orthogonal base signal S5o, which is based on the supply signal S5 of the first transmitter, the compensation signal S3 for supplying the compensation transmitter K is formed, as usual, by means of four Hilbert projections of the receiver output signal S1 onto one of the four signals S5o, S5o1, S5o2 and S5o3 and subsequent amplification and partial inverse transformation. Preferably, this is done through addition of the corresponding pre-signals S6o, S6o1, S6o2 and S6o3. In this way, the delays are supplied to the compensation transmitter.

If the difference $\Delta t_2 - \Delta t_1$ and the time period $\Delta t_3$ are maintained constant, the pulse represented by the signal S5o2 can be shifted through variation of $\Delta t_1$. As a result, the spatial point of the detectable reflections in time-of-flight systems is also shifted, for example.

Spatial Resolution of Several Objects with the Aid of Several Zones

Of course, it is also possible to produce not only three orthogonal signals for the application of the method, but a plurality of n. The further processing of these orthogonal signals S5o1, S5o2, . . . S5on is performed accordingly, so that several orthogonal pre-signals S6o1, S6o2, . . . S6on are formed from which the compensation signal S3 for supplying the compensation transmitter K is formed. Several amplifiers can also preferably be used for generating the pre-signals S6o1, S6o2, . . . S6on.

Especially preferably, when using several orthogonal signals, at least two of these signals S5o1, S5o2, . . . S5on are orthogonal to each other and not only orthogonal to the supply signal S5 of the first transmitter.

Compensation of a Delay by Delaying the Compensation Signal

In one embodiment of the method according to this disclosure, at least one delay of the further processed signal that is based on the receiver output signal S1 occurs within the feedback control loop. An orthogonal base signal S5o is produced with the supply signal S5 from which an orthogonal output signal S4o is formed after Hilbert projection with the receiver output signal S1, particularly by means of a second amplifier. The receiver output signal S1 to be further processed is delayed as a function of the orthogonal output signal S4o of the orthogonal base signal S5o in the further processing to the compensation signal S3 for supplying the compensation transmitter K. The delay can occur in the control loop at several places individually or in combination. One first possibility for the delay consists of delaying the supply signal S5 immediately before the Hilbert projection of the supply signal S5 with the receiver output signal S1. A delay can also occur during the inverse transformation, with the pre-signal from which the compensation signal is formed being delayed. After delaying of the respective signals, the delayed signals are further processed instead of the otherwise non-delayed signals. In this way, it is possible to insert a delay element at several places in the control loop in order to produce better spatial resolution during the detection of an object in the transmission path.

Handling of Near-Field Effects

In relation to this disclosure, it was recognized that, when detecting objects that are positioned closed to the receiver, the method often works at an unfavorable operating point. This is because the system components generally only work around certain operating points in a linear manner. But the entire method requires precisely that linearity. So if the system is brought with some component into an extreme operating point, this leads to nonlinearities and hence to distortions. Precisely this is the case with very small delays.

It was recognized that this problem can be circumvented in the case of a very small delay if a defined delay element is integrated before the first transmitter. This simulates a larger distance for the system, thus bringing it to a better operating point. Preferably, this delay element can be controlled. In a preferred embodiment, the first transmitter or, when using a system with several first transmitters, these first transmitters are not controlled directly by the supply signal S5. In at least one operating position or one operating state, the first transmitter or first transmitters H1 is or are controlled by a time-delayed signal S5d'.

According to the method, a base signal S5o is first generated that is orthogonal to the supply signal S5. Subsequently, a Hilbert projection of the receiver output signal S1 is performed both with the supply signal S5 and with the orthogonal base signal S5o. Optionally, the orthogonal projection image signal S10o is amplified and further processed into an orthogonal output signal S4o. The delaying of the original supply signal S5 is preferably done as a function of the orthogonal output signal S4o, which represents the time delay brought about by an object in the transmission path. The delayed supply signal S5d' is then used for supplying the first transmitter (H1) or the first transmitter.

In relation to this disclosure, it was recognized that this principle of a delayed output signal can be applied even when the actual supply signal is clocked and/or monofrequent. The delaying of the supply signal and formation of the delayed supply signal can also be achieved by means of a phase shift, since no distortion of the signal occurs then. A phase shift is possible only in this case, but not when multifrequent supply signals are used, since the signals would then be distorted.

Since the method according to this disclosure can initially be carried out in principle with any supply signal S5 for supplying the transmitter, the generation thereof is relatively simple. Depending on the application, code division multiplexing methods (Code Division Multiple Access, CDMA) can be used, for example, to generate the supply signal S5. Both synchronous and asynchronous CDMA methods can be used. This is based on the insight that broadband supply signals and broadband transmission signals are not as easy to disrupt as narrow-band signals. Consequently, unlike in the prior art, so-called spread spectrum methods can also be used to generate a spread code. The supply signal S5 for the first transmitter H1 can also therefore generally cannot, for example, by means of a random generator or a quasi-random generator. In the case of an asynchronous CDMA code, the quasi-random generator can be embodied, for example, as a feedback shift register. The feedback can preferably be achieved by means of a simple primitive polynomial (generator polynomial). For all of these methods for generating the supply signal S5, it is important that the conditions of band limitation, etc., as explained above remain intact.

It is therefore important when generating the simple primitive generator polynomial, among other things, that the output level be bipolar, i.e., that it contain no bias component on average. Only then can the filter be adjusted such that the application of the filter function to the supply signal itself yields zero. By means of the generation of a quasi-random sequence as a primitive generator polynomial that is ensured in this way, the condition can be met that the filtering of the supply signal multiplied by the interference signal leads to a minimum. One important aspect is that simple primitive polynomials do not run through all $2^n$ states of a feedback n-bit shift register, but rather only through $2^n-1$. In order to establish a 50% probability for a 1 or 0 (bias value=0), the one state that is not run through must be integrated by an additional logic. Suitable primitive generator polynomials that lead to a quasi-random sequence under feedback are indicated in the following table. This table is only exemplary and not exhaustive.

TABLE 1

| Selected primitive generator polynomials | |
|---|---|
| $1 + x$ | $1 + x + x^2$ |
| $1 + x + x^3$ | $1 + x + x^4$ |
| $1 + x^2 + x^5$ | $1 + x + x^6$ |
| $1 + x^3 + x^7$ | $1 + x + x^2 + x^7 + x^8$ |
| $1 + x^4 + x^9$ | $1 + x^3 + x^{10}$ |
| $1 + x^2 + x^{11}$ | $1 + x + x^5 + x^8 + x^{12}$ |
| $1 + x + x^2 + x^{12} + x^{13}$ | $1 + x^2 + x^3 + x^{13} + x^{14}$ |
| $1 + x + x^{15}$ | $1 + x + x^7 + x^{10} + x^{16}$ |
| $1 + x^3 + x^{17}$ | $1 + x^7 + x^{18}$ |
| $1 + x + x^4 + x^{16} + x^{19}$ | $1 + x^3 + x^{20}$ |
| $1 + x^2 + x^{21}$ | $1 + x + x^{22}$ |
| $1 + x^5 + x^{23}$ | $1 + x^{20} + x^{21} + x^{23} + x^{24}$ |
| $1 + x^3 + x^{25}$ | $1 + x + x^2 + x^6 + x^{26}$ |
| $1 + x + x^2 + x^5 + x^{27}$ | $1 + x^3 + x^{28}$ |
| $1 + x^2 + x^{29}$ | $1 + x + x^2 + x^{23} + x^{30}$ |
| $1 + x^3 + x^{31}$ | $1 + x + x^2 + x^{22} + x^{32}$ |
| $1 + x^{13} + x^{33}$ | $1 + x + x^2 + x^{27} + x^{34}$ |
| $1 + x^2 + x^{35}$ | $1 + x + x^2 + x^4 + x^5 + x^6 + x^{36}$ |
| $1 + x + x^2 + x^3 + x^4 + x^5 + x^{37}$ | $1 + x + x^5 + x^6 + x^{38}$ |
| $1 + x^3 + x^{41}$ | $1 + x + x^2 + x^3 + xy + x^5 + x^{42}$ |
| $1 + x^3 + x^4 + x^6 + x^{43}$ | $1 + x^2 + xy + x^6 + x^{44}$ |
| $1 + x + x^3 + x^4 + x^{45}$ | $1 + x + x^2 + x^3 + x^5 + x^8 + x^{46}$ |
| $1 + x^4 + x^5 + x^6 + x^{49}$ | $1 + x^2 + x^3 + x^4 + x^{50}$ |
| $1 + x + x^3 + x^6 + x^{51}$ | $1 + x + x^3 + x^{52}$ |
| $1 + x + x^2 + x^6 + x^{53}$ | $1 + x^2 + x^3 + x^4 + x^5 + x^6 + x^{54}$ |

As mentioned above, the method according to this disclosure is preferably carried out not only by means of an analog computer, but also preferably partially digitalized. Preferably, at least portions of the method are executed in digital form on a microcomputer or signal processor. The digitalization can also be performed with the aid of a Finite State Machine (FSM) or in a so-called Hidden Markov Model (HMM) or by means of a so-called Petri net or by means of a Neuronal Network (NN).

Observation of Different Physical Variables

Preferably, the method according to this disclosure can be executed with a sensor system that comprises a first transmitter, a compensation transmitter as a second transmitter and a receiver. Such a system is suitable for measuring the transmission properties of a transmission path between the first transmitter and the receiver. The sensor system is a measuring system based on feedback compensation. The first transmitter is supplied with a supply signal that is preferably generated by means of a generator and transmits a first transmission signal on the transmission path to the receiver. The compensation transmitter transmits a second signal through a second transmission path, also to the receiver, the second transmission path preferably being uninfluenced. The received signals are superimposed linearly at the receiver. Preferably, the superimposition is done through addition of the received signals. The supply signal for the first transmitter is embodied such that the receiver output signal and the supply signal form a vector space in the pre-Hilbert space.

A processing unit of the sensor system is capable of performing a Hilbert projection of receiver output signal and supply signal and to form a projection image signal. In a first amplifier, this projection image signal is further processed into an output signal through amplification.

Moreover, the processing unit is designed and set up to perform inverse transformation of the output signal with the supply signal and to form a pre-signal from it that becomes a compensation signal through further processing. The compensation signal is used for the feedback control of the receiver output signal and is fed into the compensation transmitter, which generates a compensation transmission signal from it that is transmitted to the receiver. Preferably, the inverse transformation occurs in the processing unit through multiplication and, optionally, additional addition of the corresponding signals.

The sensor system according to this disclosure has the advantage that the signal transmission between the first transmitter and the receiver can be based on a plurality of physical variables. The signal transmission can occur electronically, capacitively, inductively or electromagnetically. A transmission can take place by means of an electrical current, an electrical voltage or an electrical or thermal output. It is likewise possible to perform fluid, pneumatic, and hydraulic signal transmission. A change in a physical property (e.g., pressure) or a chemical property of a moving medium can also be used as a transmitted signal. For example, water or oils can be used. The changing of the property of a solid is also conceivable as a signal.

Both the method according to this disclosure and the sensor system according to this disclosure enable determination of the transmission properties of a transmission path or the detection of objects or media or the changing of media within the transmission path between the transmitter and the receiver. As will readily be understood, it is also possible to detect several transmission properties of the transmission path. Such transmission properties can be refractive indexes, for example. However, objects can also be measured, particularly including the object density, the object size or the object composition. The position of the object in space, the distance of the object from the receiver and the orientation of the object in space can also be detected. This can be achieved, for example, through optical detection, for example with (visible or invisible light) light, infrared radiation, radar or other radiation. However, the system is also suitable for detecting a transparency or transmission, particularly a spectrum-dependent or color-dependent transmission. In addition, the attenuation or absorption of materials, particularly the spectral-dependent or color-dependent absorption, can also be detected. Furthermore, the method is suitable for identifying reflectivity or reflection or a phase delay that occurs as a result of objects or upon passage of radiation or other physical quantities through a medium. It is even possible to detect nuclear spin interactions or nuclear spin resonances. In the case of a magnetic signal, for example, these lead to a delay of the response in the magnitude of the spin relaxation time of the atomic nuclei if they are located in a DC magnetic field.

Moreover, it is possible to detect conductivities or resistances, permeabilities or dielectric values, loss angles, etc. Likewise, velocity distributions can be determined, for example, by comparing distributions at different points in time.

The transmitters and receivers are to be embodied as a function of the quantity of the properties of the transmission path to be determined, for example as antennas, contacts, electrodes, coils, valves, LEDs, photoreceivers, pressure sensors, etc. Some examples are provided on the basis of the following figures.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
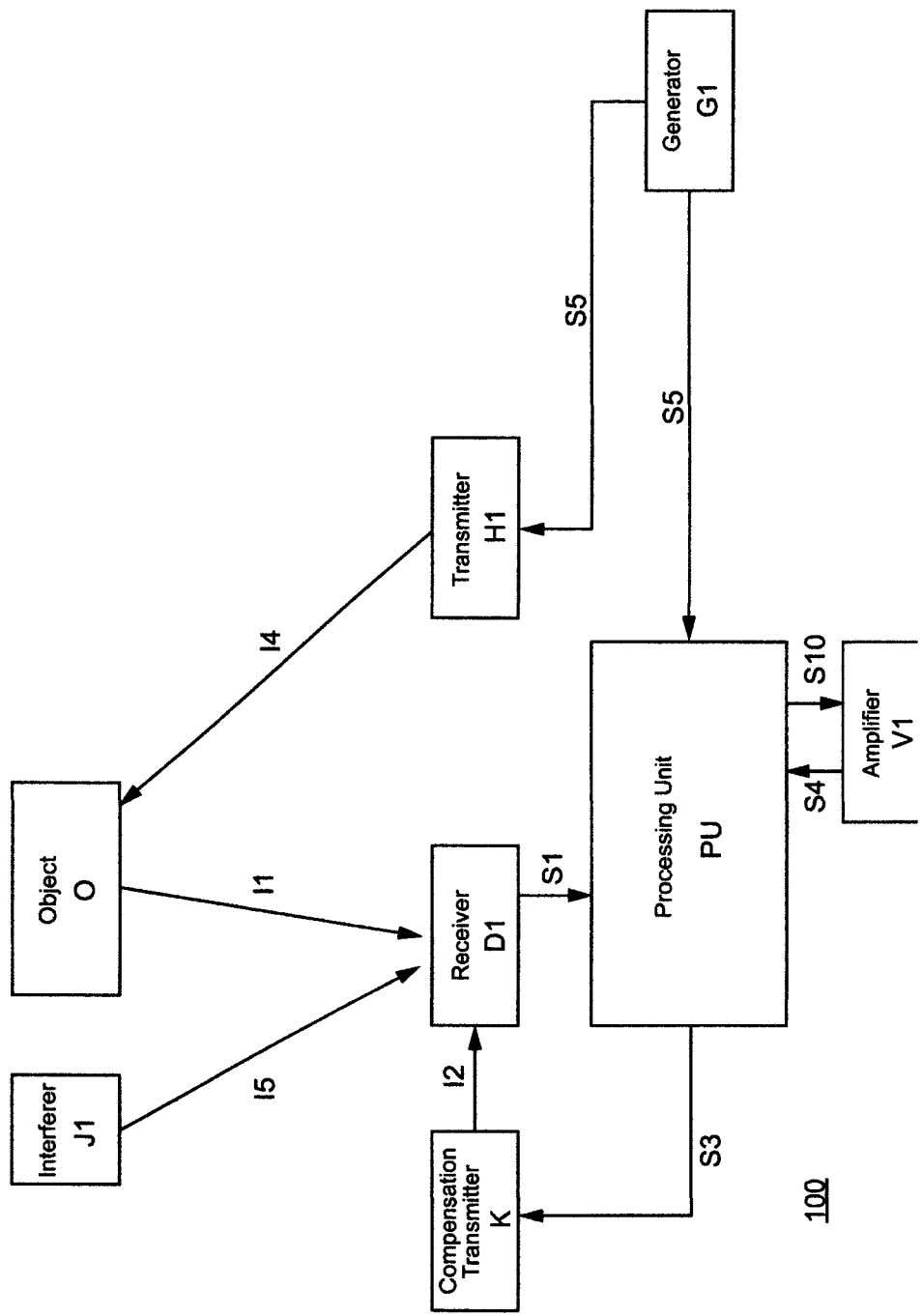
FIG. 1 shows a schematic representation of a sensor system according to this disclosure and of a generator.

FIG. 1 shows a sensor system 100 according to this disclosure and a generator G1 for generating a supply signal S5 for the sensor system 100.

The sensor system 100 comprises a first transmitter H1, a second transmitter, which is a compensation transmitter K, and a receiver D1. The sensor system 100 is used in order to measure the transmission properties of a first transmission path between the first transmitter H1 and the receiver D1. The first transmitter H1 is supplied with the supply signal S5 of the generator G1 and transmits a first signal 14 onto the transmission path that is detected in the receiver D1. The compensation transmitter K, also called compensator, transmits a second signal onto a second transmission path that is also detected by the receiver D1. In the receiver D1, the two signals are superimposed linearly, preferably through addition. The receiver D1 emits a receiver output signal S1 that is transmitted to a processing unit PU.

The receiver output signal S1 and the supply signal S5 generated by the generator G1 are embodied such that they each form a vector in a pre-Hilbert space. In the processing unit PU, a forward transformation occurs by means of a Hilbert projection from the receiver output signal S1 to the supply signal S5 such that a projection image signal S10 is formed. In an amplifier V1, this signal S10 is amplified and returned as a signal S4 to the processing unit PU. As will readily be understood, the amplification can also occur within the processing unit PU if the amplifier V1 is a component of the processing unit.

The processing unit PU then performs an inverse transformation of the output signal S4 with the supply signal S5, the two signals preferably being multiplied together. Finally, via an intermediate step of a pre-signal, the pre-signal S6 is formed first, and the compensation signal S3 is typically formed through addition of a constant with which the compensation transmitter K is then supplied such that a feedback control occurs with the receiver output signal S1.

If an object O is located in the transmission path, then the transmission signal 14 of the first transmitter H1 is changed, e.g., reflected, by the presence of the object. As a result, instead of detecting the transmission signal 14, the receiver D1 detects the signal I1 that has been altered by the properties of the object and of the transmission path. Besides that, the receiver also generally detects a parasitic interference signal 15 that is emitted by an interferer J1. As will readily be understood, the person skilled in the art will always endeavor to minimize such interferers.

For example, if optical detection of an object in the transmission path is desired, light is emitted, for example, in the visible or invisible range. In this case, the first transmitter H1 and the compensation transmitter K are light transmitters, for example an LED or a laser diode. In this example, the receiver is a light detector, for example a photodiode or photo-LED. It is thus possible to detect the distance, the position, a movement or the reflectivity of the object O in the transmission path between the first transmitter H1 and the receiver D1.

Figure 2:
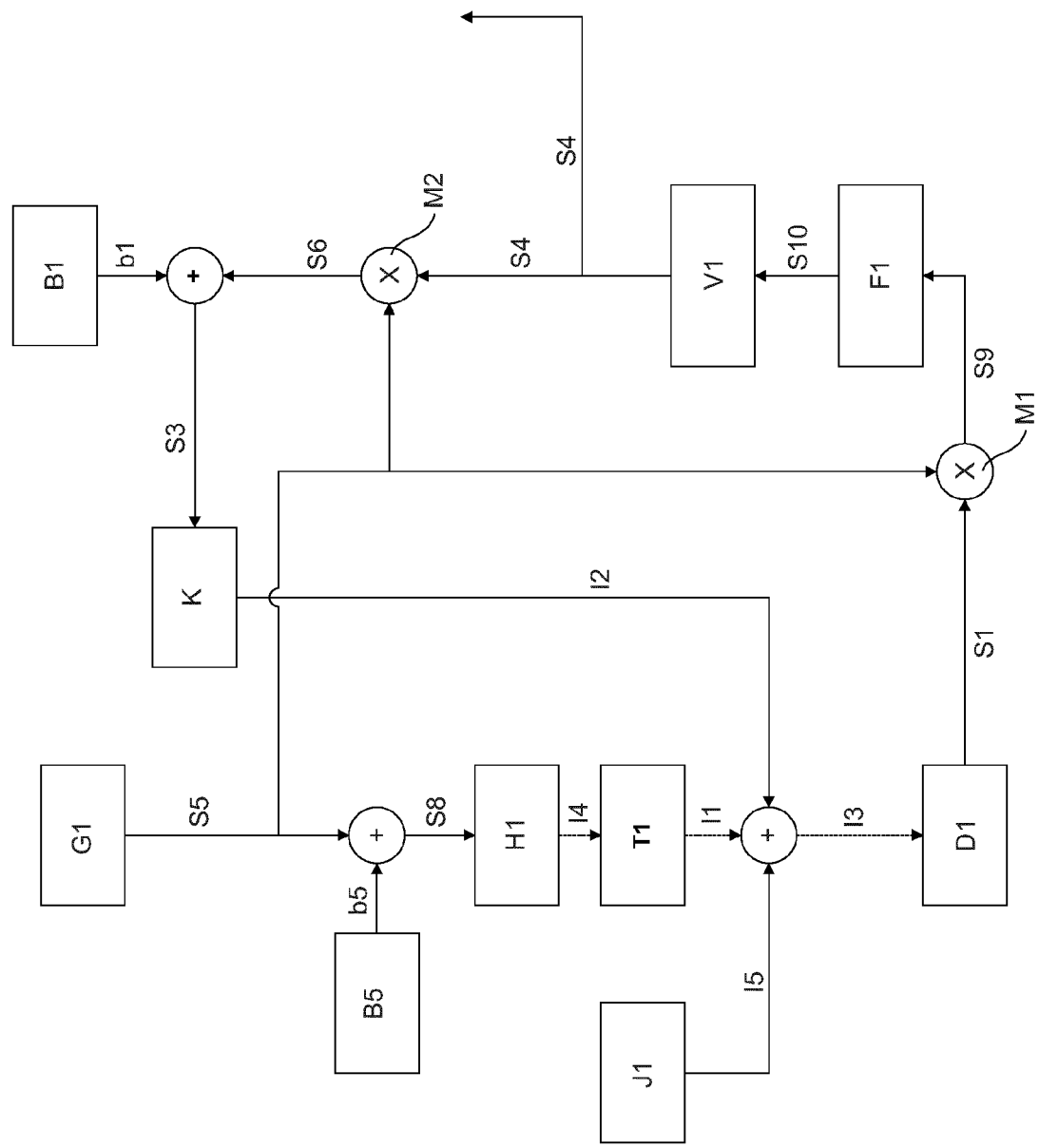
FIG. 2 shows a block diagram of a first embodiment of the sensor system according to FIG. 1.

FIG. 2 shows the basic construction of the sensor system 1, including the signal components to be processed. The generator G1 can optionally be part of the sensor system 100. However, it is also possible to construct the processing unit PU by means of an IC or ASICs that does not comprise the generator. Both embodiments are conceivable and have their respective advantages.

The supply signal S5 generated by the generator G1 is, for example, bipolar and symmetrical around a zero value. Its mean value is then zero. Therefore, in order to control LEDs, for example, a bias value b5 is preferably added to the signal S5 before the signal feeds the first transmitter as the signal S8. The bias value b5 can be generated in a bias generator B5. In general, the bias value b5 is an offset value for raising the supply signal S5, since the function-based signal could, in principle, also assume negative values. However, some classes of transmitters, such as light-emitting diodes, for example, are not able to process negative values.

Transmitter can, for example, be modulatable devices such as coils, antennas, capacitor plates, contacts, loudspeakers, lamps, light-emitting diodes, laser diodes, particle sources, ion sources, controllable valves for fluid, gaseous and other flowable material, plasma sources, etc.

FIG. 2 shows the transmission path between the first transmitter H1 and the receiver D1 and the influence thereof on the signals in the transmission path by the component T1. The influence of an object O positioned in the transmission path on the first transmission path is described in addition to other signal modifications in the transmission path by T1. The transmission signal 14 is therefore converted by T1 into the transmission signal I1. An optional interference signal 15 of an interferer J1 as well as the compensation transmission signal 12 of the compensator are added to this signal and received as a signal 13 in the receiver D1.

The Hilbert projection performed in the processing unit PU between the supply signal S5 and the receiver output signal S1 is done by multiplication by means of a first multiplying element M1 and the subsequent filtering. The detection signal S9 formed by the multiplication is filtered in a filter F1 whose output signal is supplied as a projection image signal S10 to a first amplifier V1. The output signal S4 of the first amplifier is preferably further processed and outputted as a measured value. Internally, the output signal S4, which represents the amplitude value, is transformed from the Hilbert space back into the time range. This is done by multiplication by the supply signal S5 by means of a second multiplying element M2. The pre-signal S6 formed in this way is preferably added with a bias value B1 that is generated by a bias generator B1. This bias value is needed again in order to be able to control an LED, for example, with the signal. The added signals are fed as a compensation signal S3 to the compensator K such that a feedback control loop is formed.

The system described in this way is suitable for measuring amplitude changes of the signal transmitted by the first transmitter H1.

Figure 3:
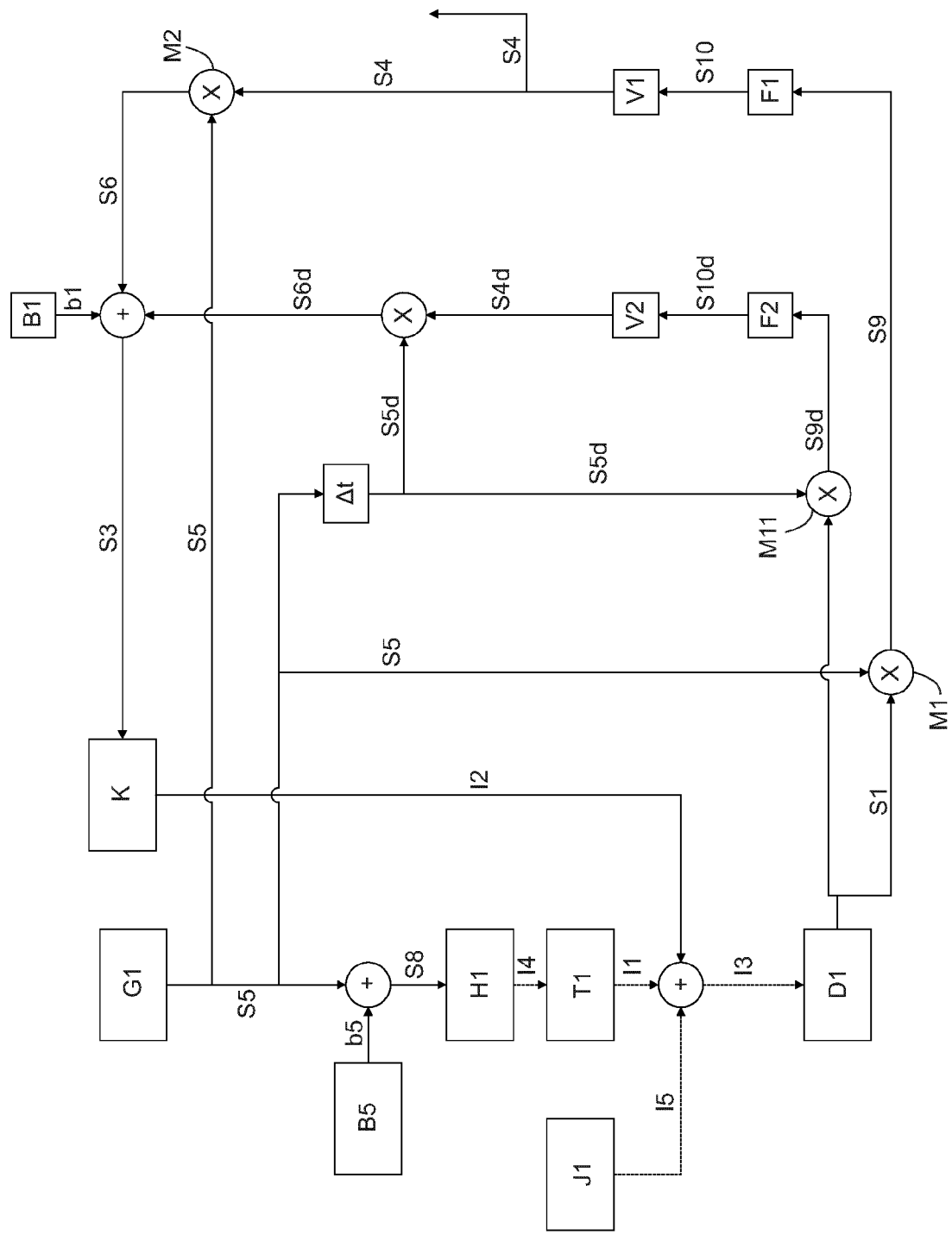
FIGS. 3 to 5 show block diagrams of other alternative embodiments of the sensor system according to this disclosure.

Since the amplitude measurement for determining an object in the transmission path T1 in the presence of different reflective objects is not suitable for performing reliable detection of the position or movement, the delay (e.g., light-travel time) must also be detected (FIG. 3). To do this, a signal S5$d$ that is delayed with respect to the supply signal S5 is formed by means of a delay element $\Delta t$ from the supply signal S5. It is processed in parallel to the processing of the transmission signal based on the supply signal S5. To this end, the part of the processing unit is substantially duplicated for the processing of the signal S5$d$. Another Hilbert projection is performed for this purpose of the delayed signal S5$d$ and the receiver output signal S1 in the duplicated processing component or a partially duplicated additional processing unit. The Hilbert projection is also typically done by multiplication by means of a multiplying element M11 to the signal S9$d$ and subsequent filtering by means of a filter F2 to the signal S10$d$ as well as amplification by means of an amplifier V2. The amplifier output signal S4$d$ is transformed by multiplication with the delayed signal S5$d$ back into the delayed pre-signal S6$d$. The delayed pre-signal S6$d$ is then added to the pre-signal S6 of the main control component in order to form the compensation signal S3 after addition of the constant b1. The delayed pre-signal S6$d$ corresponds to the delay brought about by an object. However, this method has one substantial drawback: An averaging time delay measurement of the sensor system is performed.

The system yields the measured values S4 and S4$d$. These values represent the attenuation in the transmission path and the delay. However, the two signals are not independent. This means that a change in attenuation in the transmission channel changes both signals—albeit differently. The same applies to a change in the delay. The changes are then different, however, from a change in attenuation. An inverse transformation by an evaluation unit is thus possible.

Consequently, the processing of a merely delayed but not orthogonal signal is difficult and elaborate and therefore not cost-optimizing.

For this reason, an orthogonal base signal is preferably used instead of a delayed signal for the additional Hilbert projection. The additional orthogonal base signal S5$o$ is formed, for example, from the difference between a signal S5$v$ preceding the supply signal S5 by a time period $\Delta t$ and a trailing signal S5$d$ delayed by the same time period $\Delta t$.

For this purpose, the preceding signal S5$v$ formed by the generator is first delayed by $\Delta t$ in order to form from it the supply signal S5 to feed to the first transmitter H1. In the processing unit, the supply signal S5 is then delayed again by another delay element to the signal S5*d*. The formation of the difference between S5*d* and S5*v* leads to an orthogonal signal S5*o* that is orthogonal to the supply signal S5. As a result, the scalar product of S5 and S5*o* is always zero.

Figure 4:
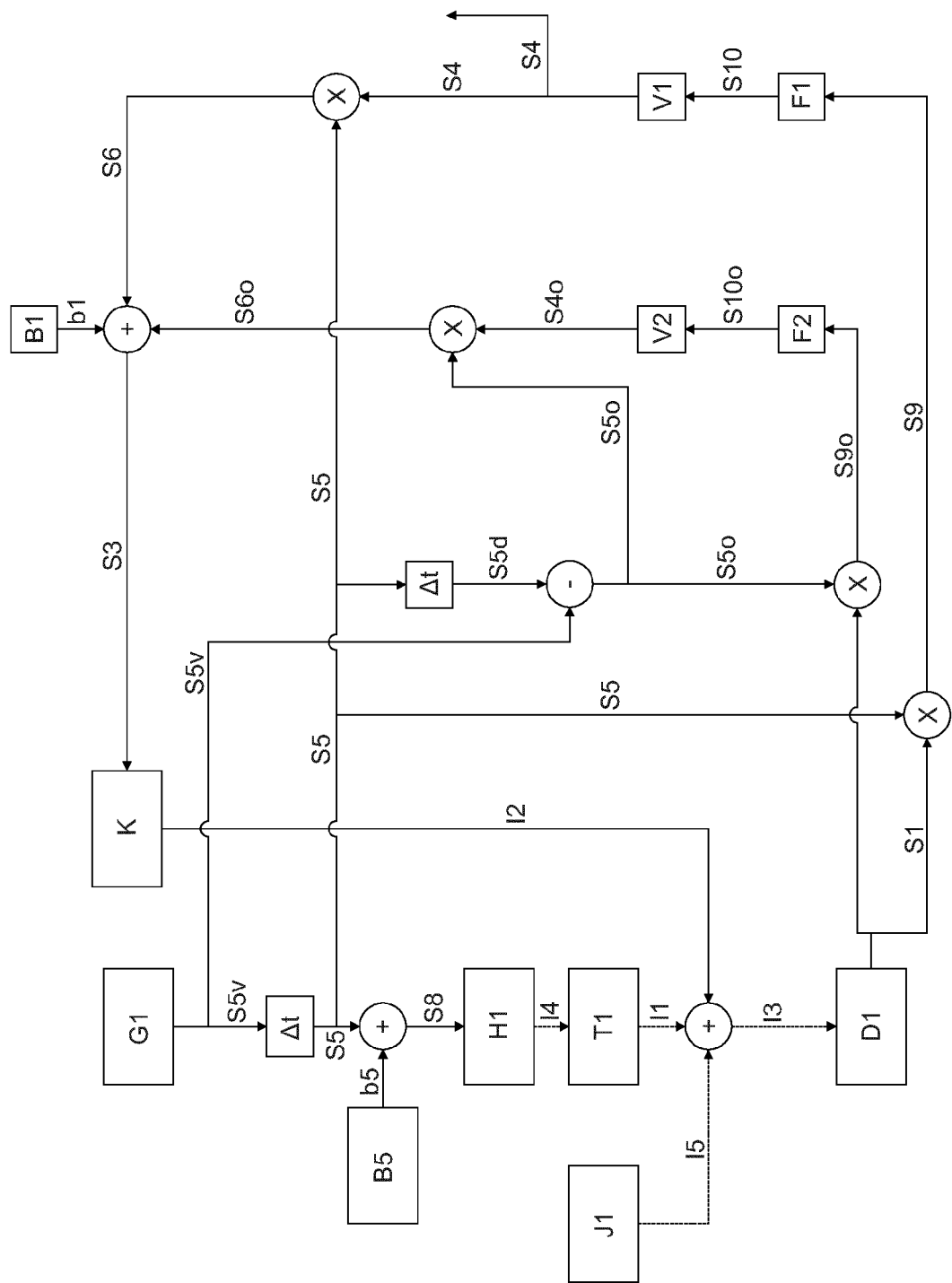

FIG. 4 shows the embodiment of the sensor system that processes such an orthogonal base signal. In comparison to FIG. 3, instead of the delayed signal S5*d*, the orthogonal signal S5*o* is now processed in the parallel processing component. In terms of their structure, the two systems are therefore distinguished only by the type and formation of the second signal used (S5*o* instead of S5*d*).

According to the proposed sensor system and the methods according to this disclosure, a vector addition thus occurs in the synthesis part of the processing unit and a scalar product formation of orthogonal base signals occurs in the analysis part. This offers a very substantial advantage over the prior art in that it is also possible to measure more than two parameters over more than two orthogonal functions. From a technical perspective, this summation-based processing can be implemented very easily, and it is also suitable in principle for any signals or functions, which represents another advantage over the prior art, which only permits monofrequent, clocked signals. Therefore, no phase control is performed, as is used in the compensating measurement methods known from the prior art, but rather a vector addition instead.

In the exemplary manner shown in FIG. 4, the use of an orthogonal base signal ultimately means observing the object in a certain time slot. For the sake of completeness, it should be mentioned here that the use of orthogonal base signals is not limited to this time slot-based method. If more precise observation is to be performed through several time slots, several orthogonal base signals S5*oi* are preferably generated that are orthogonal to the supply signal S5.

Figure 5:
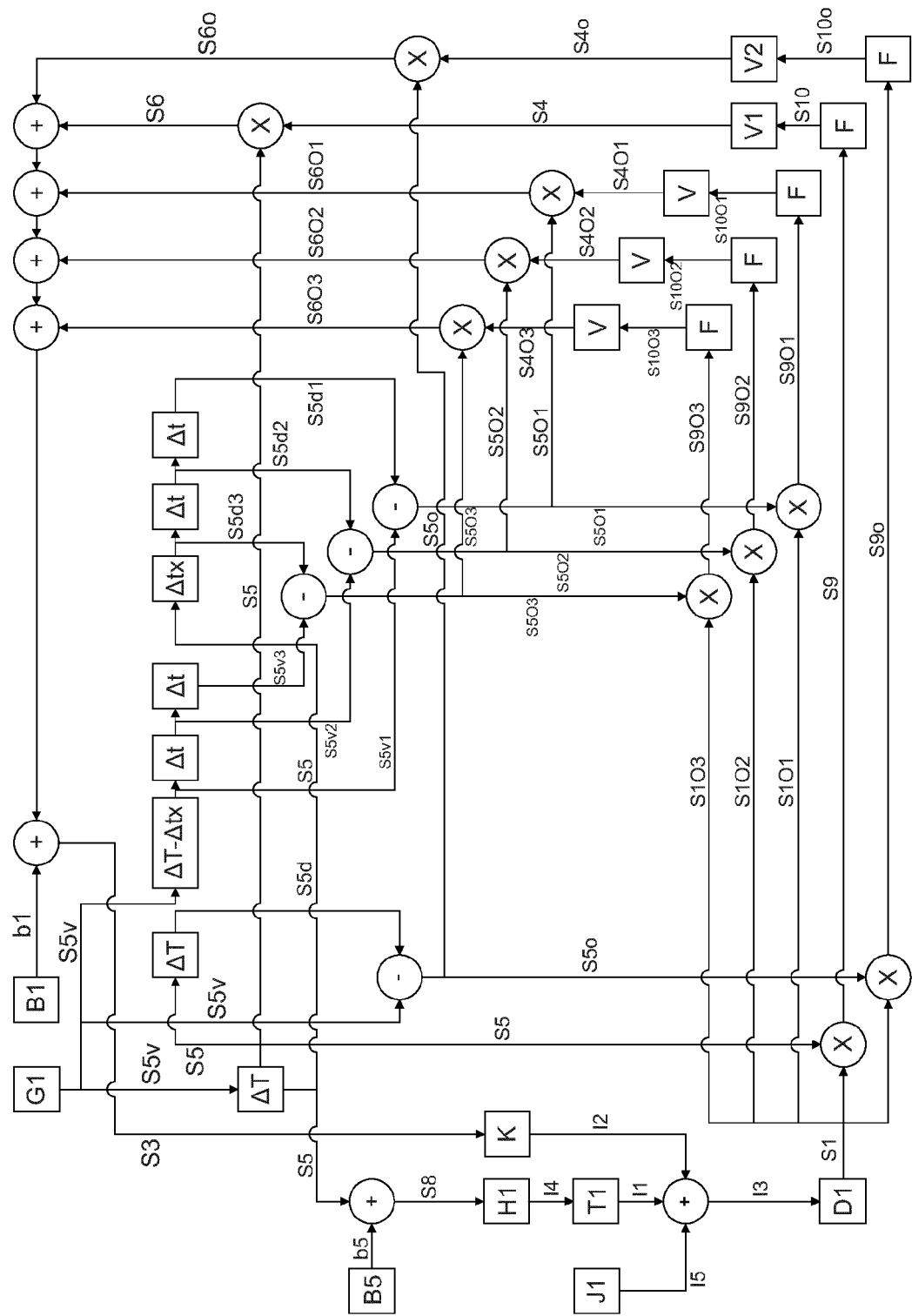

FIG. 5 shows an example of a system with several orthogonal base signals S5*o*, S5*o*1, S5*o*2 and S5*o*3. Typically, $\Delta T \gg \Delta t$ and $\Delta tx < \Delta T - 2\Delta t$. The following is preferably true of $\Delta T$: $\Delta T < 1/(4\pi\omega_{max})$. However, these base signals are only "semi-orthogonal" since, while they are all orthogonal to the supply signal S5, they are not all orthogonal to each other. The processing and evaluation of the generated signals S4, S4*o*, S4*o*1, S4*o*2 and S4*o*3 in the subsequent system is therefore technically difficult. For this reason, a system is preferably constructed of completely orthogonal base signals.

Figure 6:
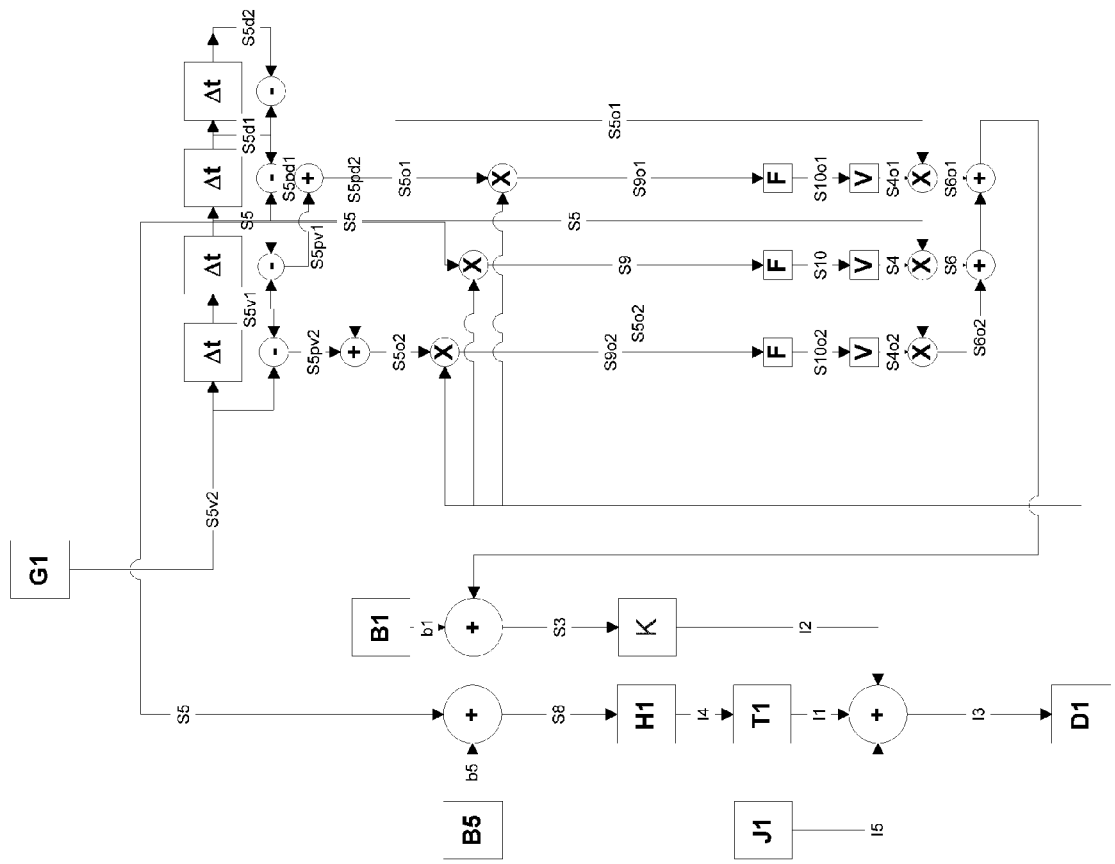
FIG. 6 shows a simplified diagram of an alternative embodiment of the sensor system with orthogonal base signals based on double pulses.

FIG. 6 shows a sensor with three orthogonal base signals (S5, S5*o*1, S5*o*2). Two preceding and two trailing signals are generated for this.

In general, several orthogonal signals can be generated. For this purpose, n preceding signals S5*vi* are first generated, with i indicating the respective number (i=1, 2, 3, . . . , n). A signal S5*vi* therefore precedes the signal S5 by i periods (time periods) $\Delta t$. The maximum lead time is $\Delta T = n*\Delta t$. Simultaneously, n trailing signals are also generated analogously to the signal S5. A signal S5*di* follows the signal S5 by i time periods $\Delta t$. The maximum lag time is again $\Delta T = n*\Delta t$.

From these signals, it is possible, for example, to generate preceding and trailing pulse signals, particularly 2*n pulse signals, respectively, for example. For example, on the condition that the supply signal can take the values +1, −1, one obtains for the preceding pulses $$S5pvi = \frac{1}{2} \cdot (S5vi - S5v(i-1)),$$

where S5*v*0=S5. The same then applies for the trailing pulse signals:

$$S5pdi = \frac{1}{2} \cdot (S5d(i-1) - S5di) \text{ where } S5d0 = S5.$$

Figure 7:
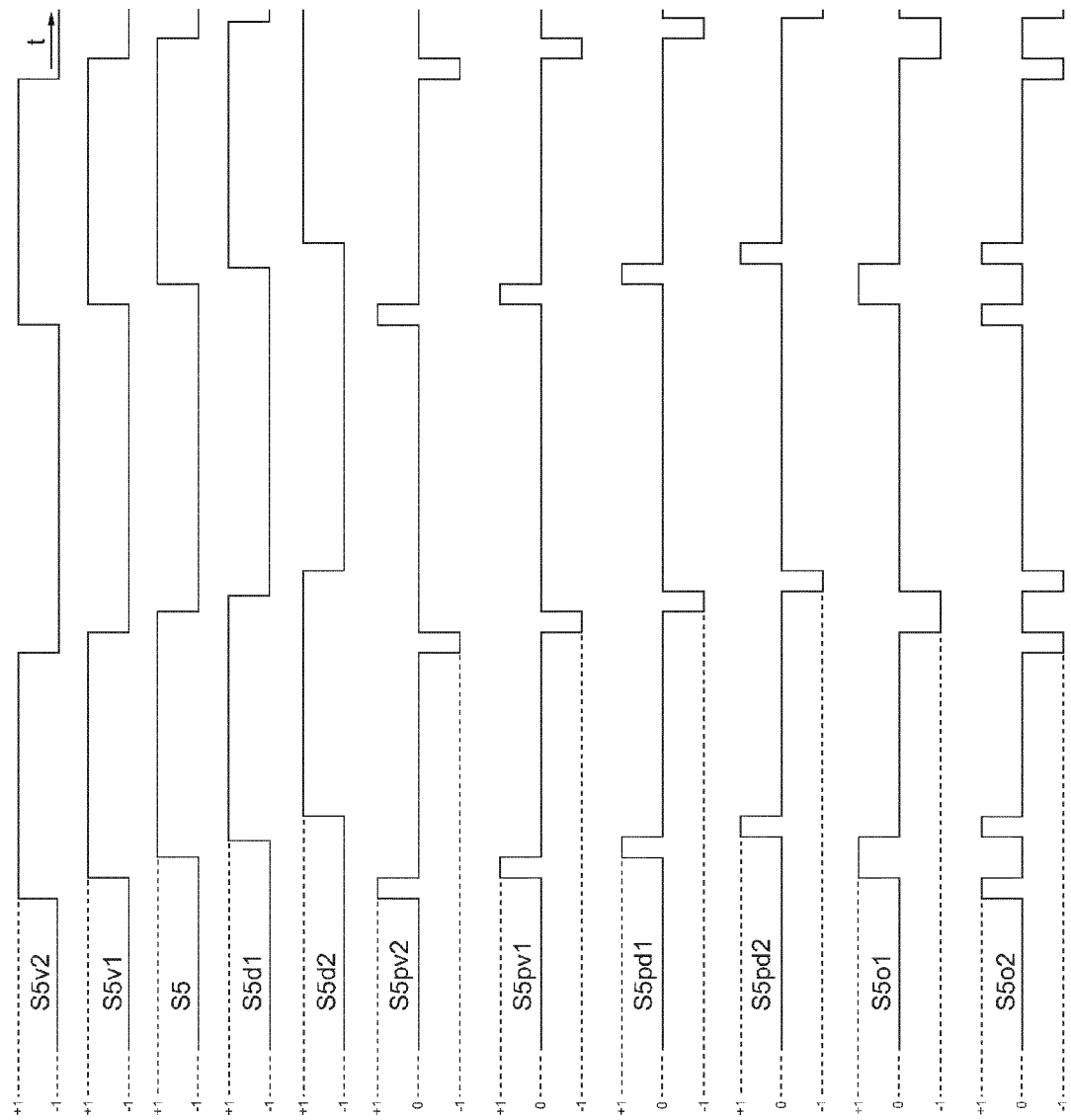
FIG. 7 shows the chronological sequence of the signals of the sensor system according to FIG. 6.

However, the pulse signals then have three conditions as a function of the values i. It can be shown that the orthogonal base signals S5*o*1 and S5*o*2 formed therefrom are both orthogonal to S5 and orthogonal to each other. For the sake of example, FIG. 7 shows this for two preceding and two trailing pulse signals.

It is obvious that the orthogonal base signals S5*oi* form an orthogonal base signal system together with the supply signal S5. However, the processing of preceding pulses is not desired technically, since preceding pulses also occur in the compensation signal. These preceding pulses are necessary, nonetheless, since the supply signal S5 overlaps with each of the trailing pulses.

It is therefore desirable to produce an orthogonal base signal system without preceding pulses. Such pulses (S5*oi* without preceding pulses) are designated in the following by S5*pi*. If one looks at the reason for the necessity of preceding pulses, one notices that this is solely due to the fact that, without the preceding pulses, the orthogonal base signals S5*pi* would yield a quantity different from zero in the Hilbert projection with S5. The simplest method for working around this is to orthogonalize the set of signals consisting of S5 and the S5*pi*. Since the S5 and S5*pi* are predetermined, this can already be done in the construction phase. One finds methods in BRONSTEIN, section 19.2.1.3 "Orthogonalisierungsverfahren" [Orthogonalization methods], for example. Since the S5*pi* (S5*oi* without preceding pulses) are already orthogonal to each other, their respective scalar product, consisting of S5 scalar-multiplied by the respective signal S5*pi*, is subsequently subtracted from S5. One obtains the signal S5*r*. This signal is now orthogonal to all S5*pi* (S5*oi* without preceding pulses). In this way, one obtains a base signal set consisting of the S5*pi* and S5*r* that are orthogonal to each other.

In order for orthogonality to be achieved, the signal S5 must be zero again on average, which is to say it must contain no bias component. This property then also applies automatically to the S5*pi* signals.

The receiver output signal S1 can therefore be adjusted substantially to zero in the range of a possible measurable delay n*$\Delta T$ (n=maximum value of i). The signal S5*r* generated from the supply signal can be represented as the difference of S5 from the sum of all trailing pulses. We thus have $$S5r = \frac{1}{2} \cdot (S5dn + S5),$$

where S5*dn* is the pulse delayed by n periods.

Figure 8:
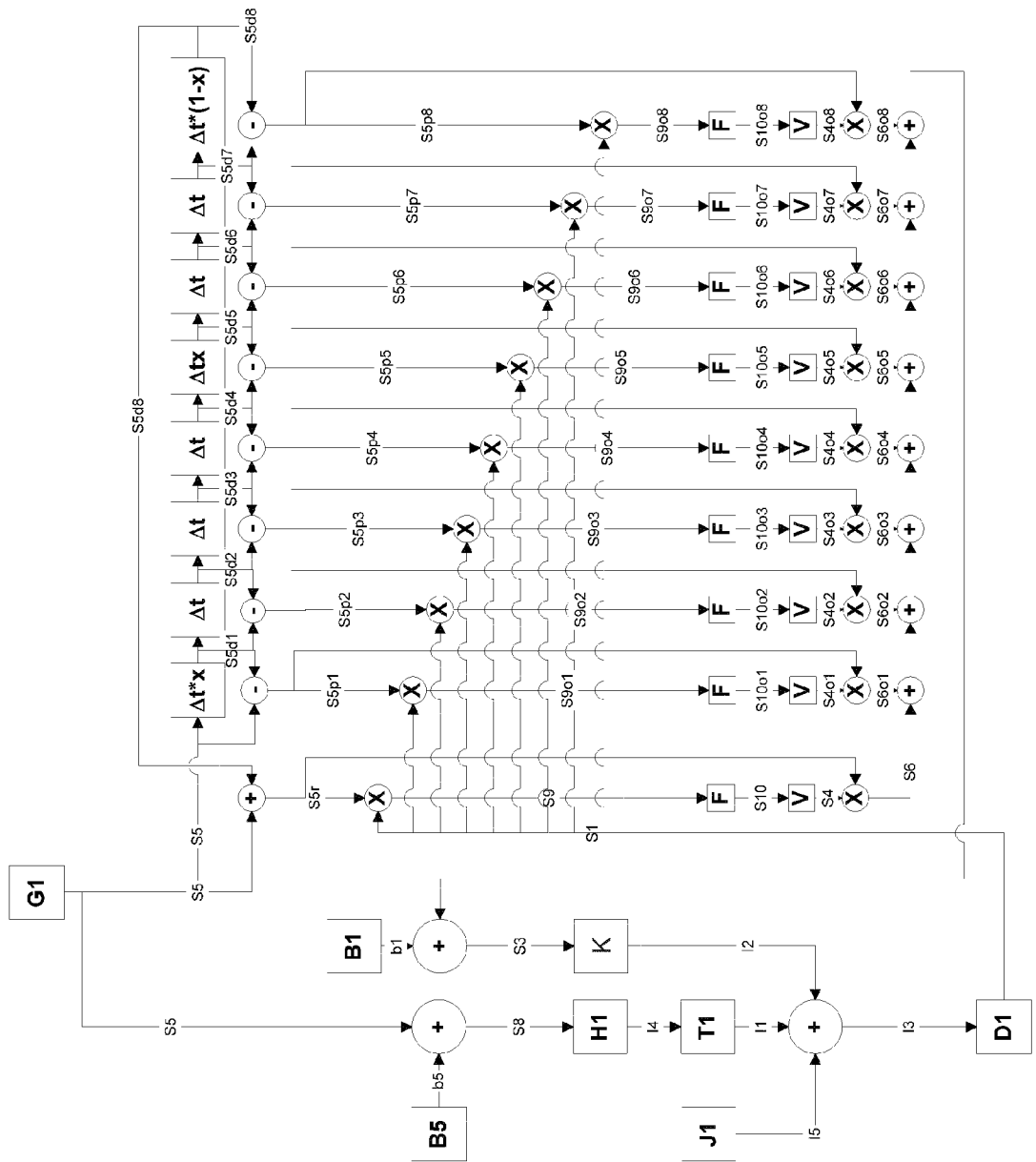
FIG. 8 shows an alternative embodiment of the sensor system with an orthogonal base signal.

FIG. 8 shows such a system which produces an orthogonal base signal set for any quasi-digital clocked and non-clocked input signals. The sensor system shown can observe eight time slots for the detection of reflections caused by an object. The length of the last and of the first pulse can each be scaled to each other in a compensating manner. As will readily be understood, additional time slots can also be observed in parallel; for this, it is only necessary to produce and process additional delayed pulses. This is important if the reaction time of the overall system is to be reduced. For example, if an optical radar is to be constructed with the system, there can be applications for which successive measurement with a different scaling factor x are sufficient. In other applications, however, time may not be available for additional measurements. In these cases, it expedient to measure with more channels (S5$pi$).

Figure 9:
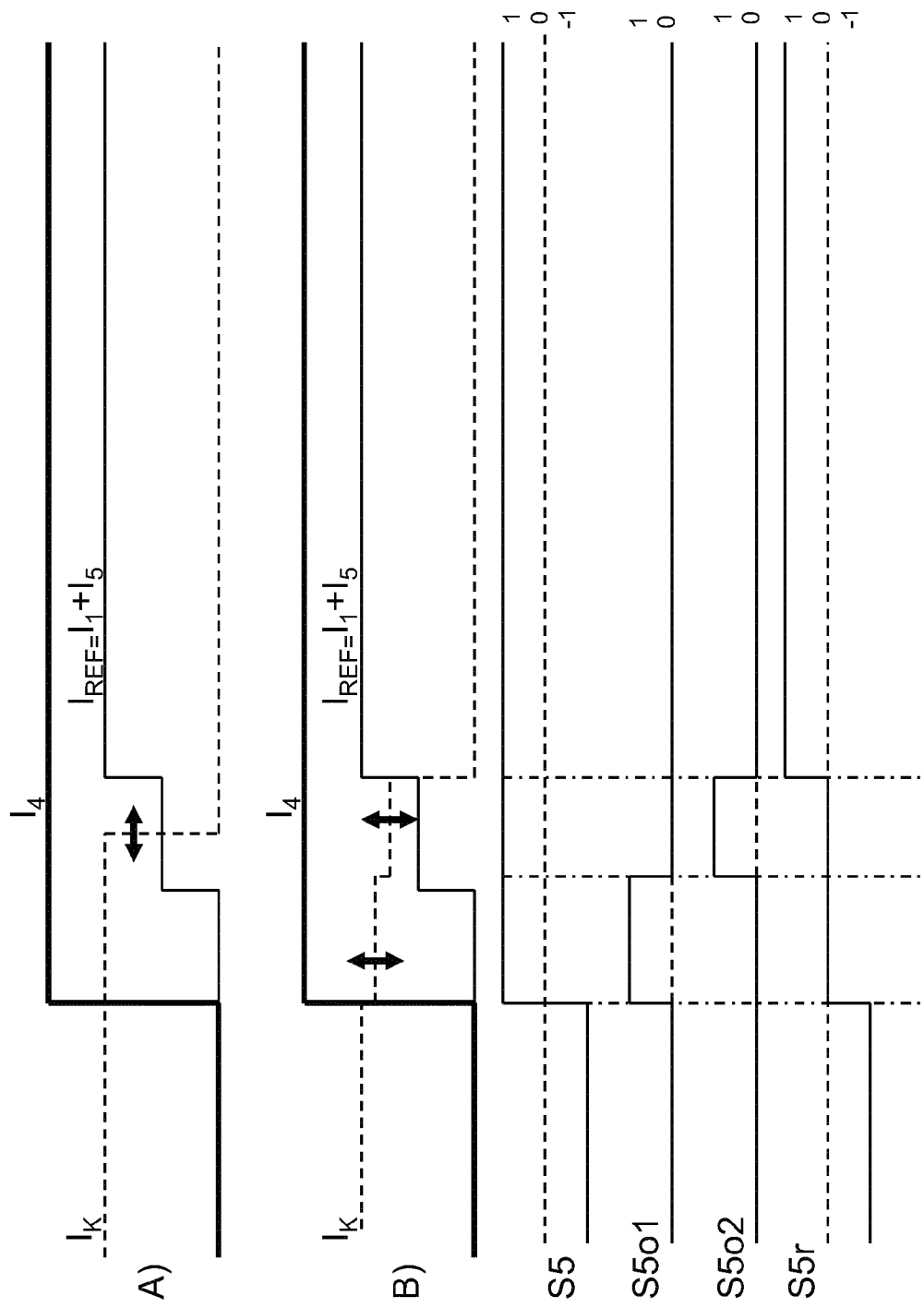
FIG. 9 shows a schematic diagram of the compensation in comparison to the prior art.

FIG. 9 shows in the upper image (A) how compensation can be performed according to the prior art by means of an averaging phase control of the compensation signal. Through the presence of an object, the transmitted transmission signal 14 of the first transmitter is changed in the transmission channel, and a reflected signal is received in the receiver D1. To compensate for the reflection, the compensation signal $I_K$ of the compensation transmitter K is phase-shifted. Particularly if a stepped reflection signal is received, this compensation is imprecise.

For example, in an application as an optical radar, if a post in front of a wall is supposed to be detected, the system adjusts to a system-specific mean value between wall and post. The post is therefore not reliably identified. An automobile using such a radar as a parking aid will drive into the post without any additional protective measures, since the driver is told that there is more space there than there actually is.

The lower image (B) in FIG. 9 shows the non-averaging control through the mixing-in of several (specifically two) orthogonal base signals with the compensation signal $I_K$ (corresponding to 12) through vector addition. This enables more precise compensation to be achieved, which brings the advantages of the method according to this disclosure to light in an impressive manner. The following generalization can be made: The greater the number of orthogonal base signals, the greater the resolution and precision per measurement that can be achieved. The individual stages in the multistage reflection signal can be adapted individually through feedback control of the individual orthogonal base signals S4*oi*.

Since only the signal edges are evaluated, that is, since step functions are used, the signals S4*oi* in FIG. 8 only yield an integrative picture. In the parking aid mentioned above, this means that a signal on the output signal S4*n* means that a reflection has taken place somewhere in front of it. Only when a signal S4*on* shows a signal and the signal S4*o*(n−1) does not is it clear that the reflection can be allocated to the nth time slot. For this reason, the signals have to be differentiated from each other. (This corresponds to the transition from a step function-based system to a system operated with a delta pulse.)

Figure 10:
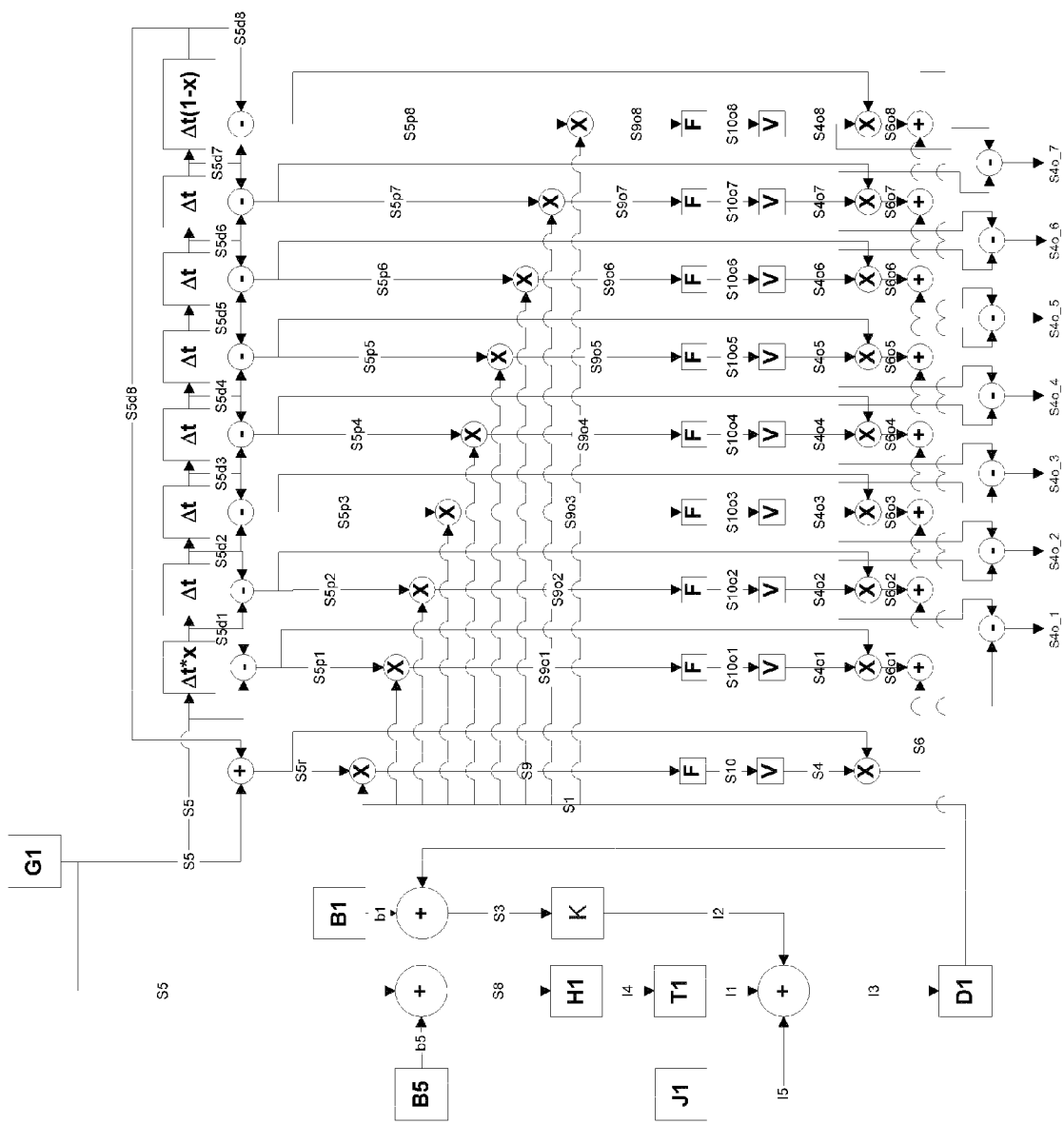
FIGS. 10 and 11 show additional alternative embodiments of the sensor system with several orthogonal base signals.

FIG. 10 now shows, for the sake of example, a seven-channel spatially resolving sensor system with an orthogonal base signal set that serves this purpose. Here, the first and the last channel of the system, which is to say the time-shift, can be scaled with any factor x. There is a separate control for each time slot. The essential difference, however, is the formation of the differential at the outputs (S40*oi* where 1≤i≤7) from S4*oi* and S4*o*(i+1). A reflection is thus allocated to the time slot in which it occurs.

Figure 11:
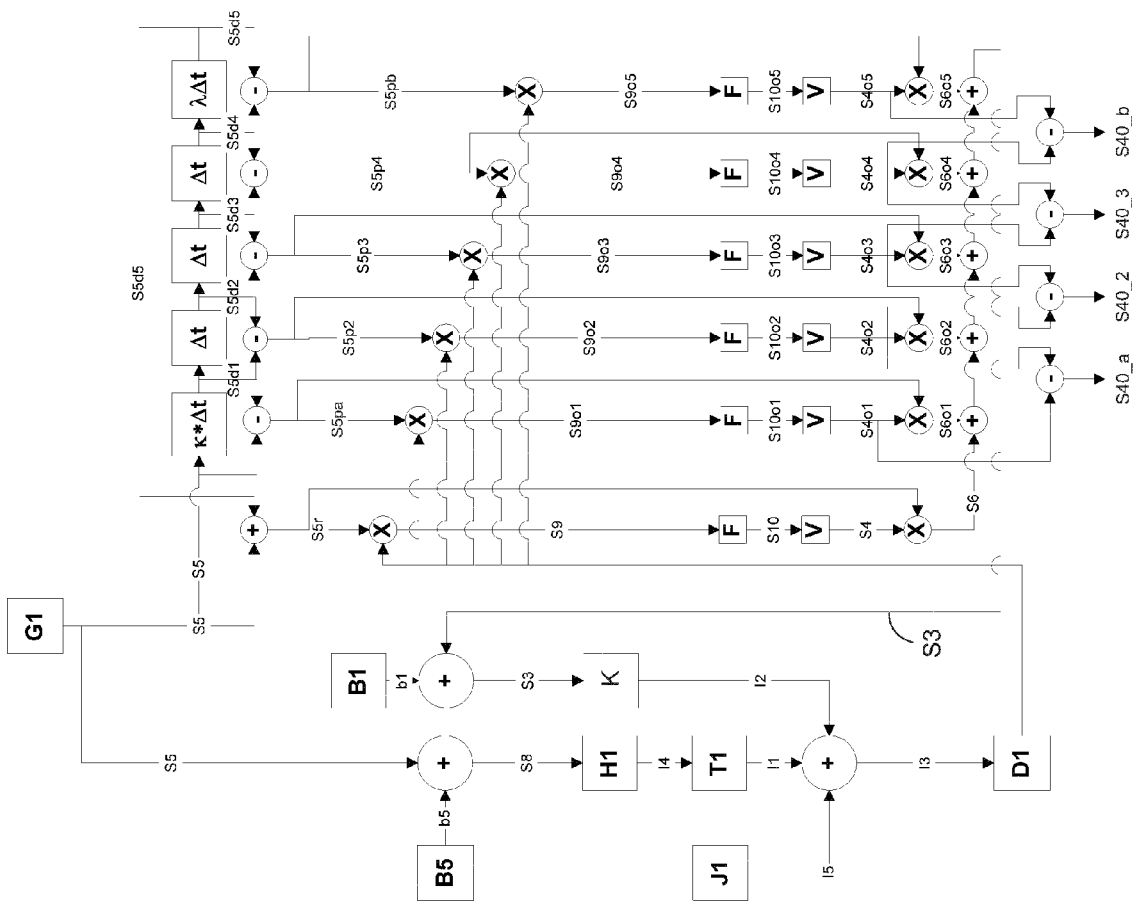

In general, however, it is tedious to construct a separate control for each channel i. In cases in which all that is to be determined is whether the reflection occurs in a certain time window j, the κ=j−2 base signal pulses S5$pi$ can be merged with i=1 to i=(j−2) into one pulse signal S5$pa$. Therefore, only one delay element where κ·Δt is required. The pulses S$pi$ for i=j−1, i=j and i=j+1 remain unchanged. The λ=n−i−2 pulses S5$pi$ for i=j+2 to i=n are merged into the second base signal pulse S5$pb$. For these pulses as well, only one delay element with a time delay of λ·Δt is required. The system thus has only the orthogonal base signal set consisting of the orthogonal pulse signals S5$pa$, S5$p$ (j−1), S5$pj$, S5$p$ (j+1), S5$pb$ and S5$r$, the pulse S5$r$ being equal to the difference from the supply signal S5 to the sum of all orthogonal base signals. The corresponding system diagram is shown in FIG. 11. This enables the number of delay elements to be reduced substantially.

However, it is advantageous to leave two or, in this case, three time slots (here S5$p$2, S5$p$3 and S5$p$4). The first difference, which is also drawn in FIG. 11, yields the reflection point, as discussed. If a difference of the differences is formed (not shown), then surface slopes, etc., of the reflecting surfaces can be determined, for example.

With the system shown, a possibility has therefore been developed for performing a time delay measurement and one-dimensional localization. Unlike the prior art, two-dimensional localization can easily be achieved by means of triangulation over two measuring paths using two mutually orthogonal supply signals S5 and S5' and particularly without the use of a time slot method. Besides the use of two complete sensor systems corresponding to the systems shown, the use of mixed sensor systems is conceivable in any case. The mixing can either consist of the common use of the transmitters and/or common use of the receivers.

In one embodiment, the sensor system has a plurality of generators G*i* that generate several supply signals S5*i*. A corresponding plurality of transmitters H*i* is supplied with the respective supply signal S5*i*. The resulting plurality of transmission paths is transmitted by the transmission signals 14*i* of the respective transmitter H*i* to the receiver D1. In the receiver, the first transmission signals 14*i* are superimposed with the second signal 12 of the compensation transmitter K into the receiver output signal S1. Any interference signals 15 are also superimposed.

In the processing unit, a pre-signal S6*i* is generated for each first supply signal S5*i* of each transmitter H*i* from which the compensation signal S3 is formed. This is preferably done through addition of the pre-signals S6*i*.

Figure 12:
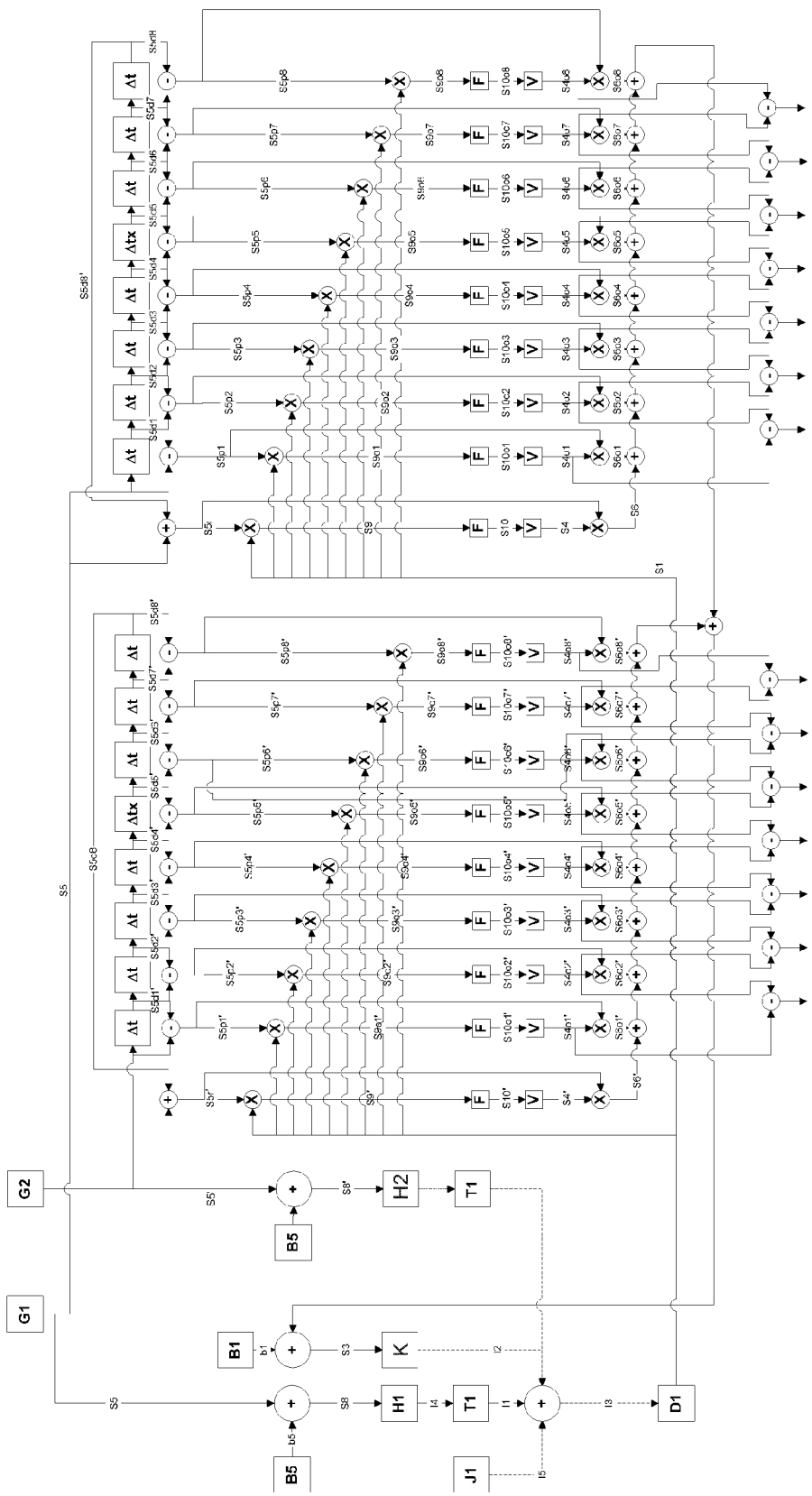
FIG. 12 shows a simplified diagram of an embodiment of the sensor system with two transmitters and a receiver.

Such a system with two transmitters H1, H2 and one receiver D1 is shown in FIG. 12.

In another embodiment, the sensor system has several receivers D*i* and several compensation transmitters K*i*, a compensation transmitter K*i* being allocated to each receiver D*i*. If there is only one first signal transmitter H1, a transmission path is formed to each receiver D*i*. The individual receivers D*i* superimpose the signals of the first transmitter with the second signals of the respective compensation transmitter K*i* into a receiver output signal S1*i*. In the processing unit, a compensation signal S3*i* is generated for each compensation transmitter for the feedback compensation of the output signals of the respective receiver D*i*.

Figure 13:
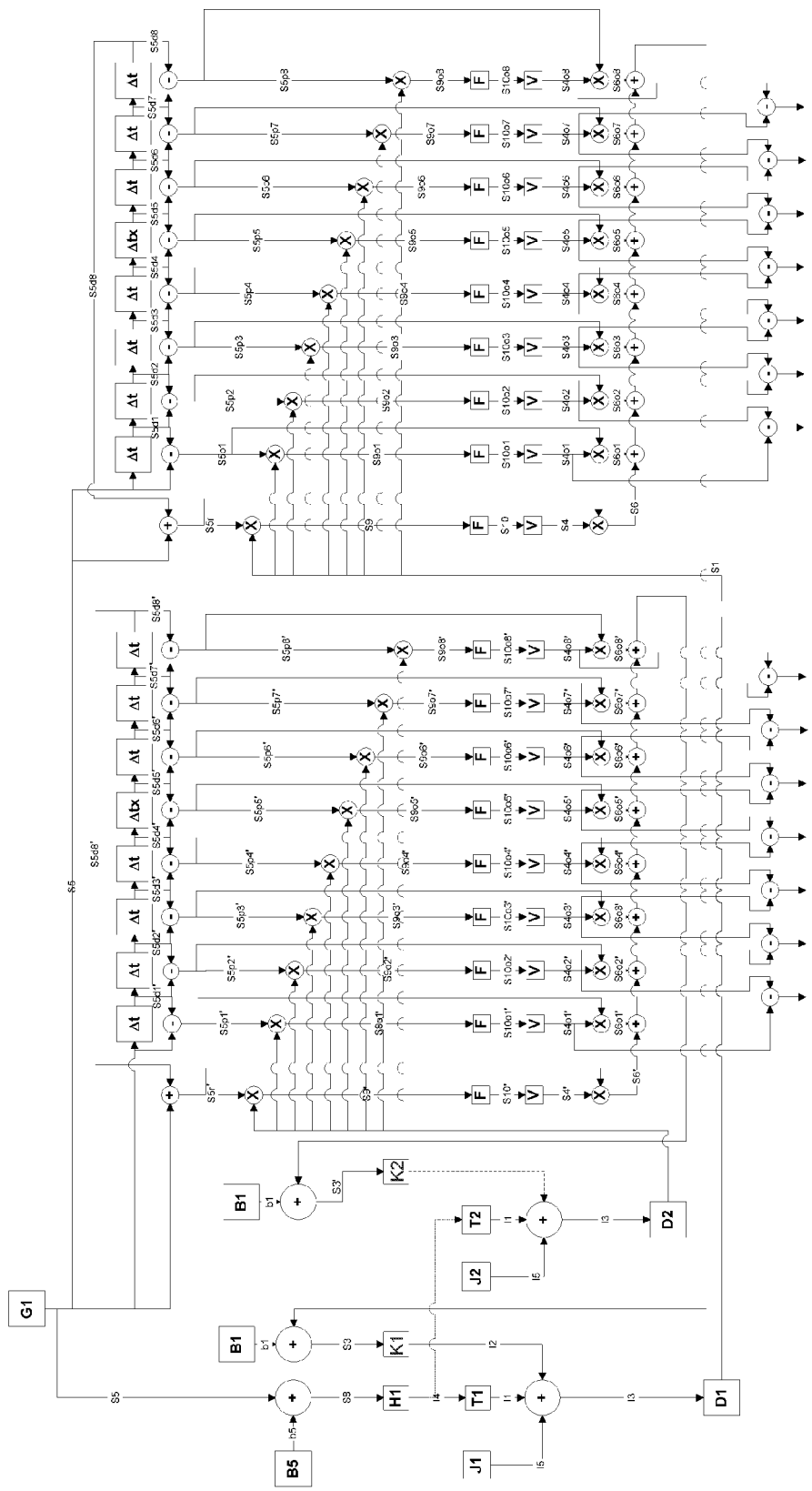
FIG. 13 shows a simplified diagram of an alternative embodiment of the sensor system with a transmitter and two receivers.

Such a system with one transmitter and two receivers D1, D2 as well as two compensation transmitters K1, K2 is shown in FIG. 13. As will readily be understood, several receivers can also be combined. It is also possible to combine several transmitters and several receivers with each other.

Besides the simple systems just shown, more complex systems are also conceivable that have a plurality of transmitters H*i* and a plurality of receivers D*j* as well as a plurality of compensation transmitters K*j*. The transmitters are generally each fed from one generator, a generator also being capable of generating several transmission signals S5*i*.

Figure 14:
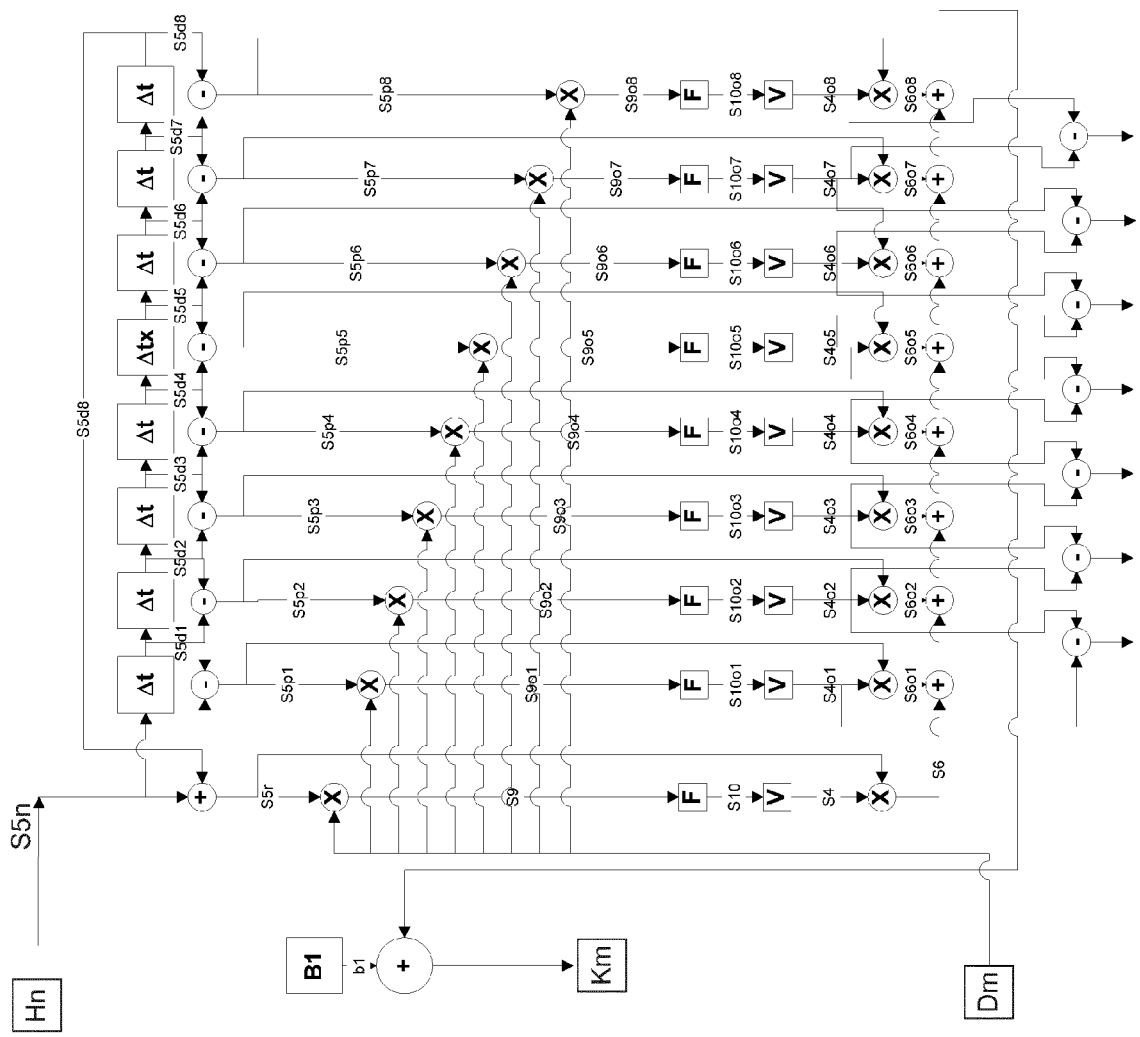
FIG. 14 shows a simplified diagram of a correlator for constructing a multi-stage tomograph with several transmitters and receivers.

For the n generators, n orthogonal codes, for example, are established as supply signals. As a result, interference between the individual transmitters H*i* is suppressed. This is another substantial difference from the prior art. If the transmission properties of the respective transmission paths T$nm$ between the respective transmitter H*n* and receiver D*m* and the respective time delays are to be determined, it is necessary to measure the n*m pairs of transmitter and receiver. In addition, it is also possible to use m*n processing units. A correlator is required for each measurement. One example of such a system module, also referred to as a correlator, is shown in FIG. 14 as a schematic system diagram. As can easily be seen, the system from FIG. 13 can be constructed from two correlators, for example.

If the need should arise to use more receivers than compensation transmitters, the solution to this problem can lie, for example, in the use of a time division multiplex method in which a single processing unit is used for several receivers and connected via multiplexes to the various transmitters and receivers, for example.

Preferably, the sensor system has several receivers Di and at least one, preferably several compensation transmitters Ki, with one compensation transmitter K1 being allocated to at least two receivers D1, D2. A transmission path is formed between the first transmitter H1 and a receiver Di, respectively, so that the first signal of the first transmitter is superimposed with the signal of the corresponding compensation transmitter Ki into a receiver output signal S1$i$ in each receiver Di. A compensation signal S3$i$ is generated for each compensation transmitter Ki in the processing unit. The compensation signals S3$i$ are formed by respectively switching back and forth in the time division multiplex method between the processing units of the signals S1$i$ of the receivers Di, which share at least one compensation transmitter Ki. The processing units that intermittently do not contribute to the compensation signal S3$i$ as a result of the time division multiplex are connected such that their internal states and output responses do not change during this time. The processing units that intermittently contribute to the compensation signal S3$i$ as a result of the time division multiplex behave for the duration of their contribution as if no time division multiplex were taking place.

Figure 15A:
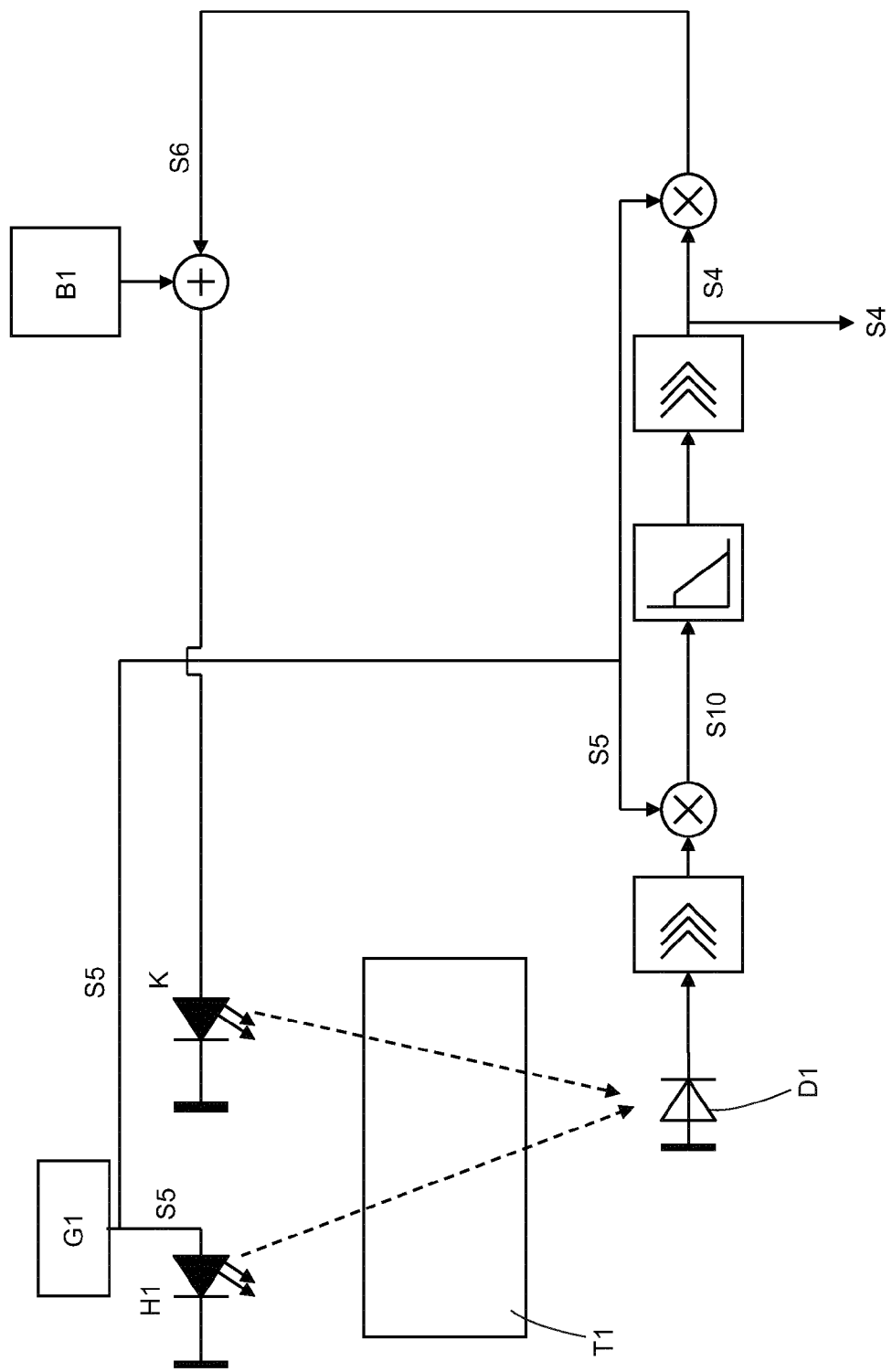
FIGS. 15a and 15b show a diode spectrometer as a gas sensor in single-channel or multi-channel (here two-channel) form.
Figure 15B:
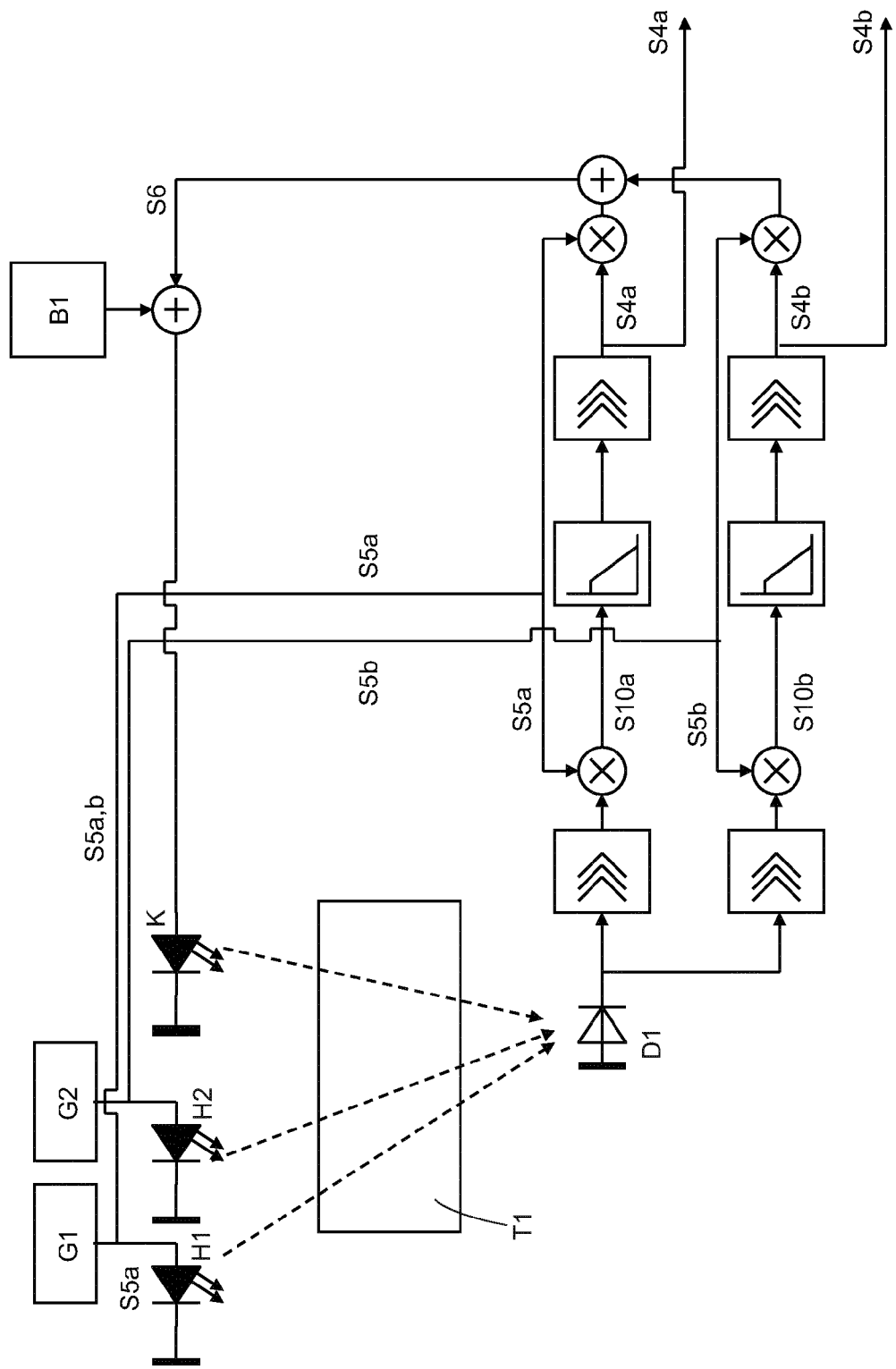

FIG. 15 shows a block diagram of a sensor system according to this disclosure that is embodied as a diode spectrometer. Such a spectrometer can be used as a gas sensor or titration sensor. The system shown in FIG. 15$a$ has a common measurement channel. The transmitter H1 is embodied, for example, as a laser diode that radiates substantially only on one absorption wavelength. The measuring path between the laser diode and the receiver D1 embodied as a photodiode is to be measured. The compensation transmitter K is a reference diode that radiates at a wavelength that lies right next to the absorption wavelength. The light of this compensation transmitter is subject to substantially the same influences as the light of the transmitter H1. The only exception is the amplified absorption on the absorption wavelength. The receiver D1 is sensitive to the light of both transmitters (H1 and K). In this way, an analyte or component of a gas in the measuring path, for example a cuvette, can be detected. The compensation signal 12 is also conducted through the measuring path (cuvette). Although the second transmission path is consequently no longer known in terms of some properties that are irrelevant here—optimal control can be achieved and an analyte in the gas can be detected using the method according to this disclosure.

It should be emphasized here that the two transmission channels lie in the same medium and differ here only in terms of wavelength. In that respect, the space division multiplex is replaced by a wavelength multiplex of the carrier light.

Therefore, when there is mention in this document of various transmission channels, the word "various" refers to some type of multiplex.

FIG. 15$b$ shows a system with two parallel control components and two transmitters H1, H2, each embodied as laser diodes. The diodes radiate at different absorption wavelengths. The compensation diode K radiates at a wavelength that lies right next to the absorption wavelengths. It is thus possible to construct a two-channel gas sensor. In taking this idea further, multi-channel gas sensors are conceivable.

Figure 16A:
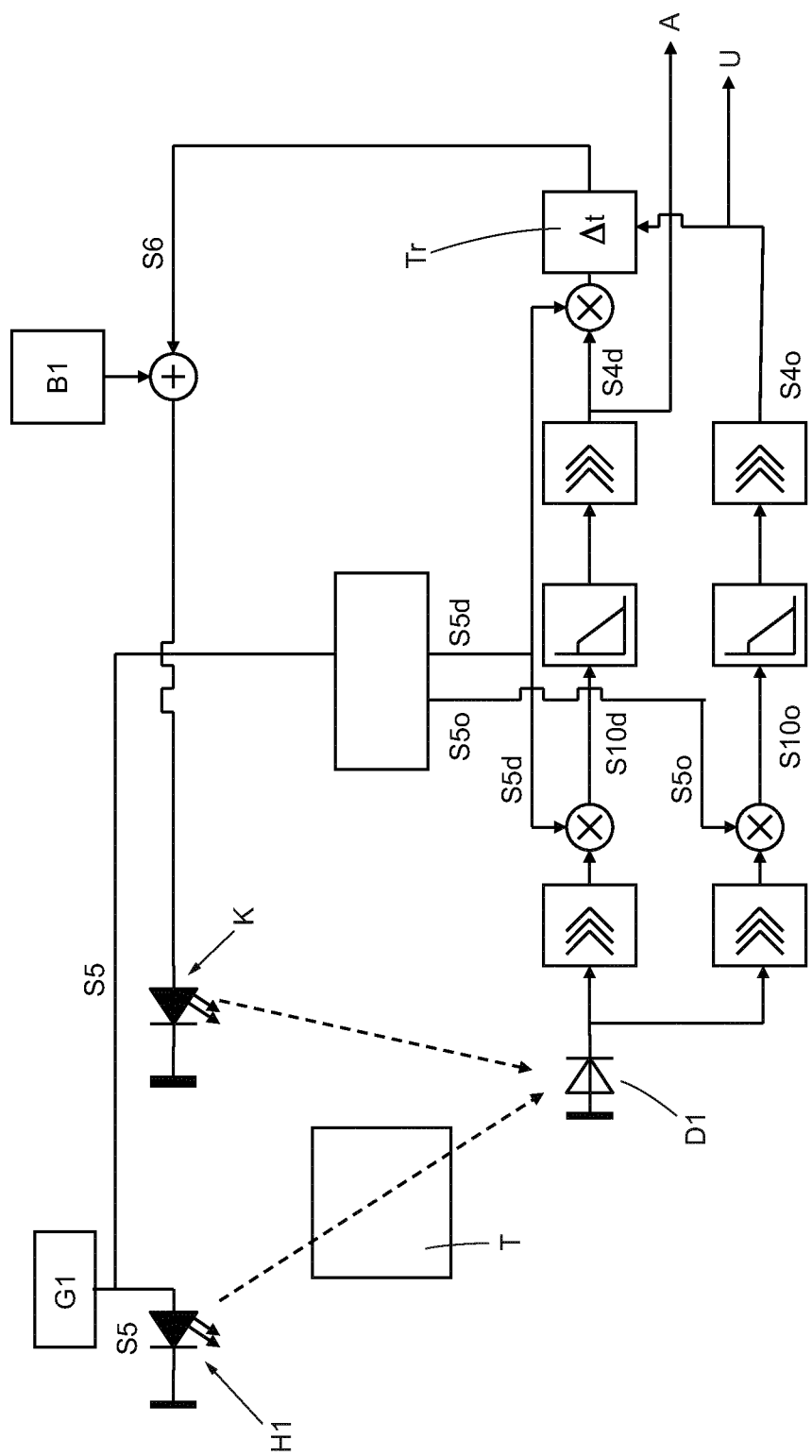
FIGS. 16a to 16c show a time-of-flight measurement by means of diodes for distance measurement.
Figure 16B:
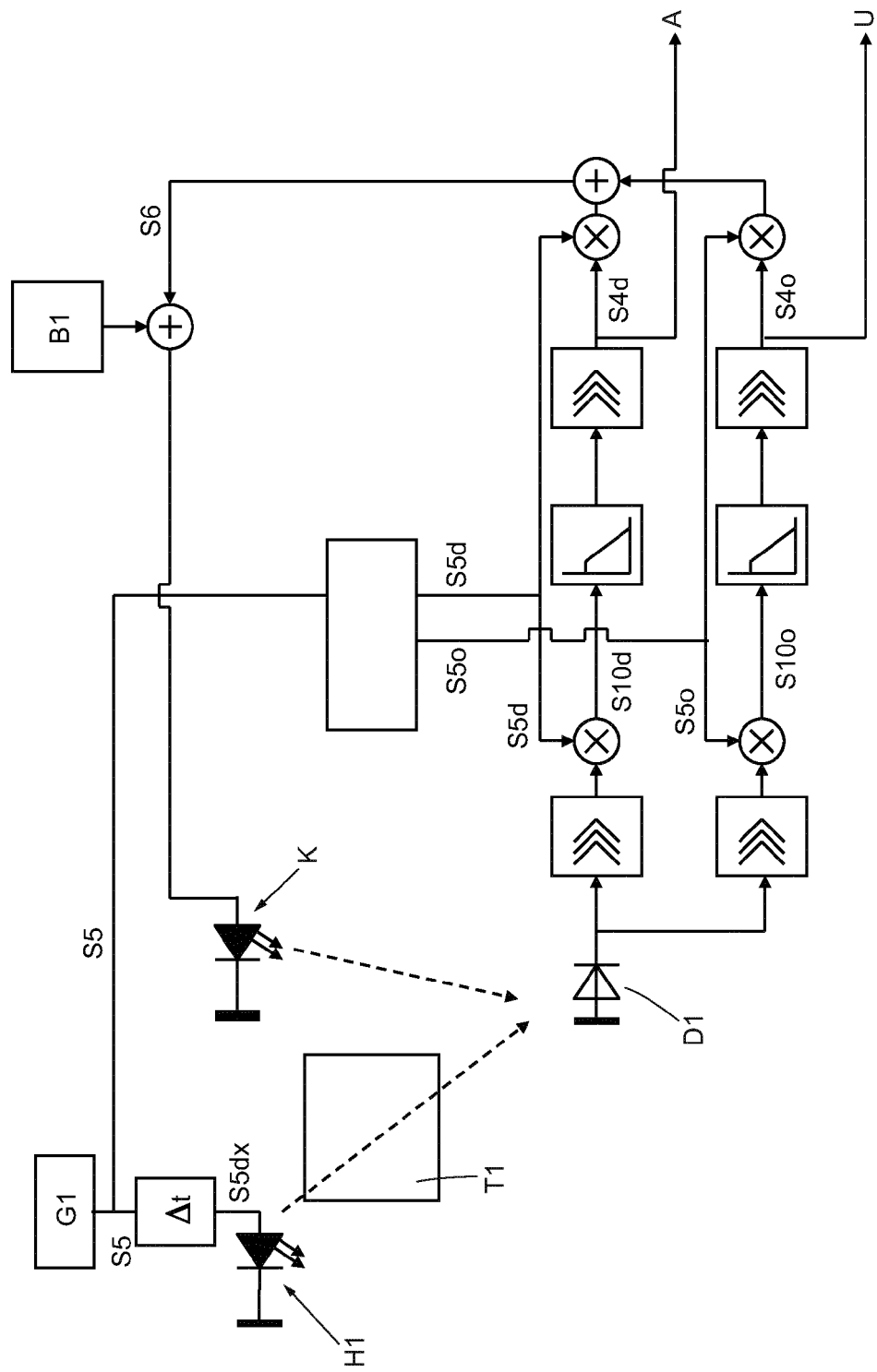
Figure 16C:
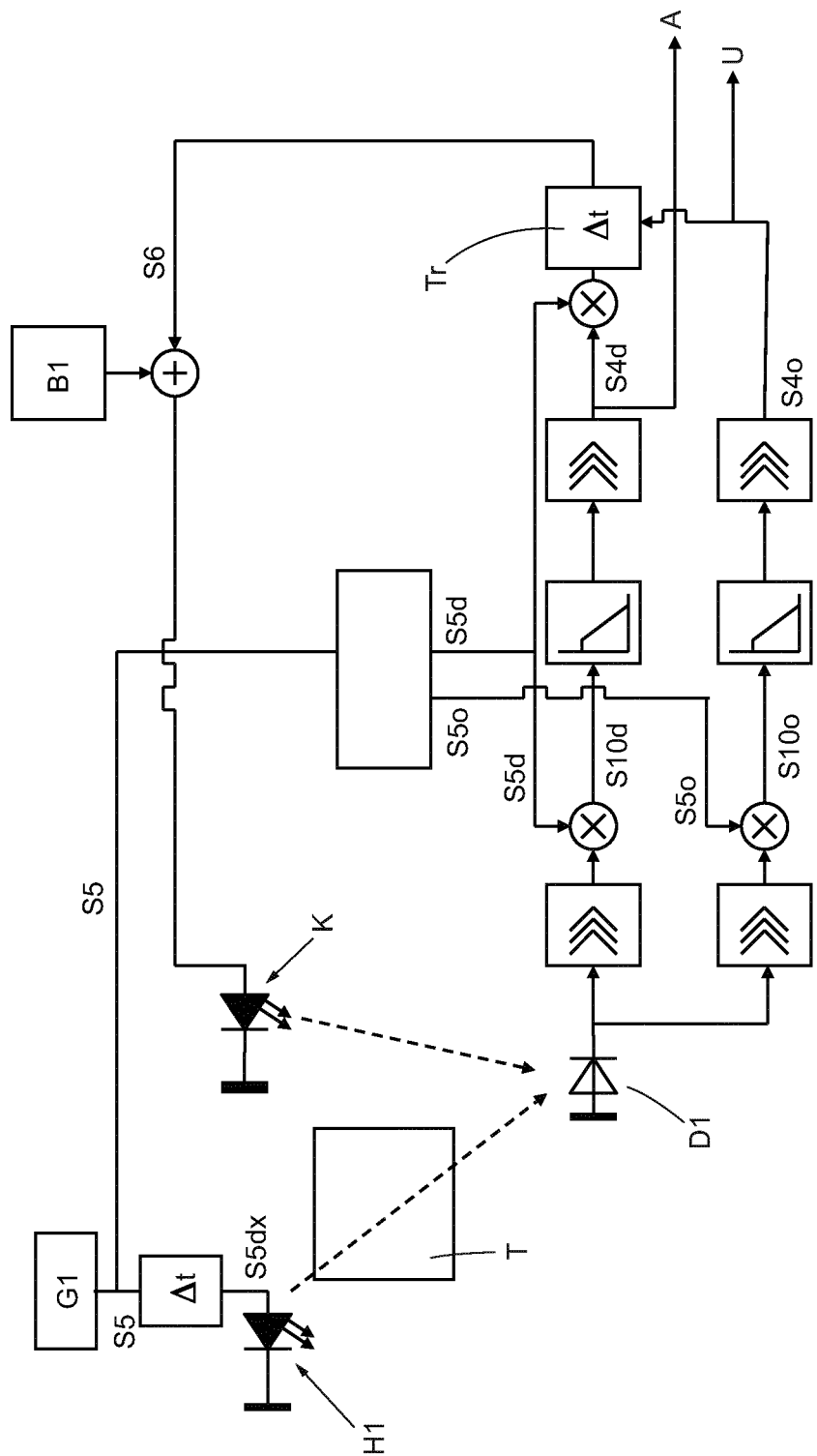

Another area in which the sensor system according to this disclosure can be used is in optical time-of-flight measurement such as that used, for example, for measuring distance. Such a system is shown in FIGS. 16$a$ to $c$ in various embodiments. FIG. 16$a$ shows one simple embodiment in which the transmitter H1 and the compensation transmitter K are each embodied as diodes. The receiver is a photodiode. An object of measurement in the transmission path between transmitter H1 and receiver D1 is to be measured. In the depicted embodiment, a controlled delay element Tr is used to form the compensation signal S3 that is controlled via the detected delay that is based on the output signal S4$o$. A delaying of the pre-signal S6 thus takes place during the inverse transformation. The delaying of the compensation signal thus enables a balancing of the delays occurring in the transmission channel. Unlike the prior art, which uses a phase control, a delay enables the use of broadband multi-frequent signals, thus substantially improving interference suppression in relation to an interferer in the transmission channel.

FIG. 16$b$ shows a modified time-of-flight measuring system without the delay during the inverse transformation. In this system, however, a range-switchover is performed, thus enabling a distance measurement in the near range. For this purpose, the transmitting diode H1 is not supplied with the supply signal S5, but rather with a delayed supply signal S5$dx$. As a result, a greater distance is simulated to the system. At smaller distances in particular, the system does not come up against its limits. This makes it possible to optimize the working point of the receiver. The distortion of the output response can easily be corrected beforehand through selection of the delay $\Delta t$ and hence by subtraction.

FIG. 16$c$ shows another modification of a time-of-flight measuring system that enables optimized distance measurement in the near range of the receiver D1. Here, the two systems previously shown have been combined together. A delaying of the supply signal for feeding the transmitting diode is thus performed. At the same time, a delay controlled by means of the orthogonal output signal occurs in the inverse transformation to produce the compensation signal.

Figure 17A:
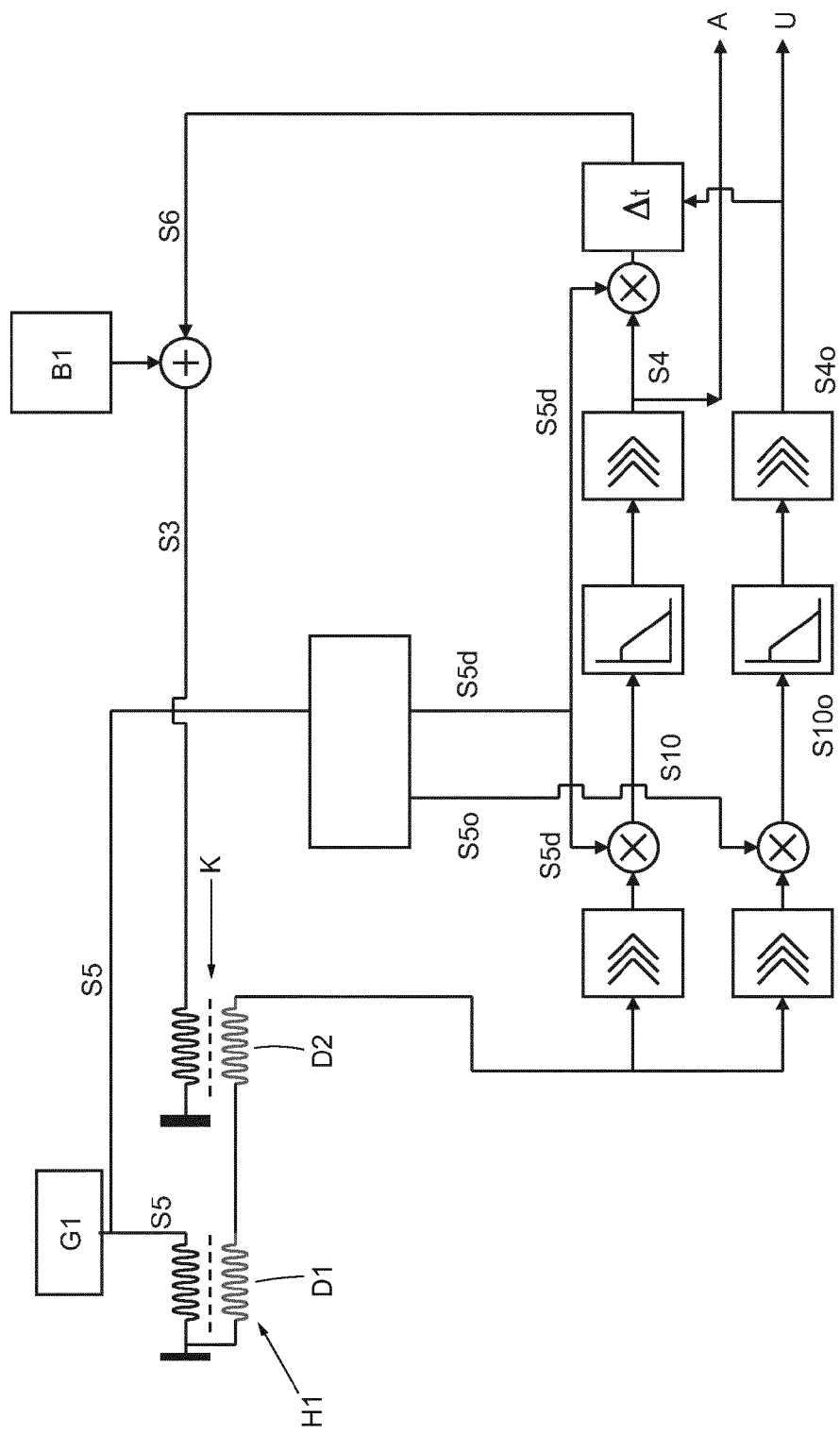
FIGS. 17a and 17b show a simplified diagram of a sensor system for measuring electromagnetic waves by means of compensating magnetic antennas.
Figure 17B:
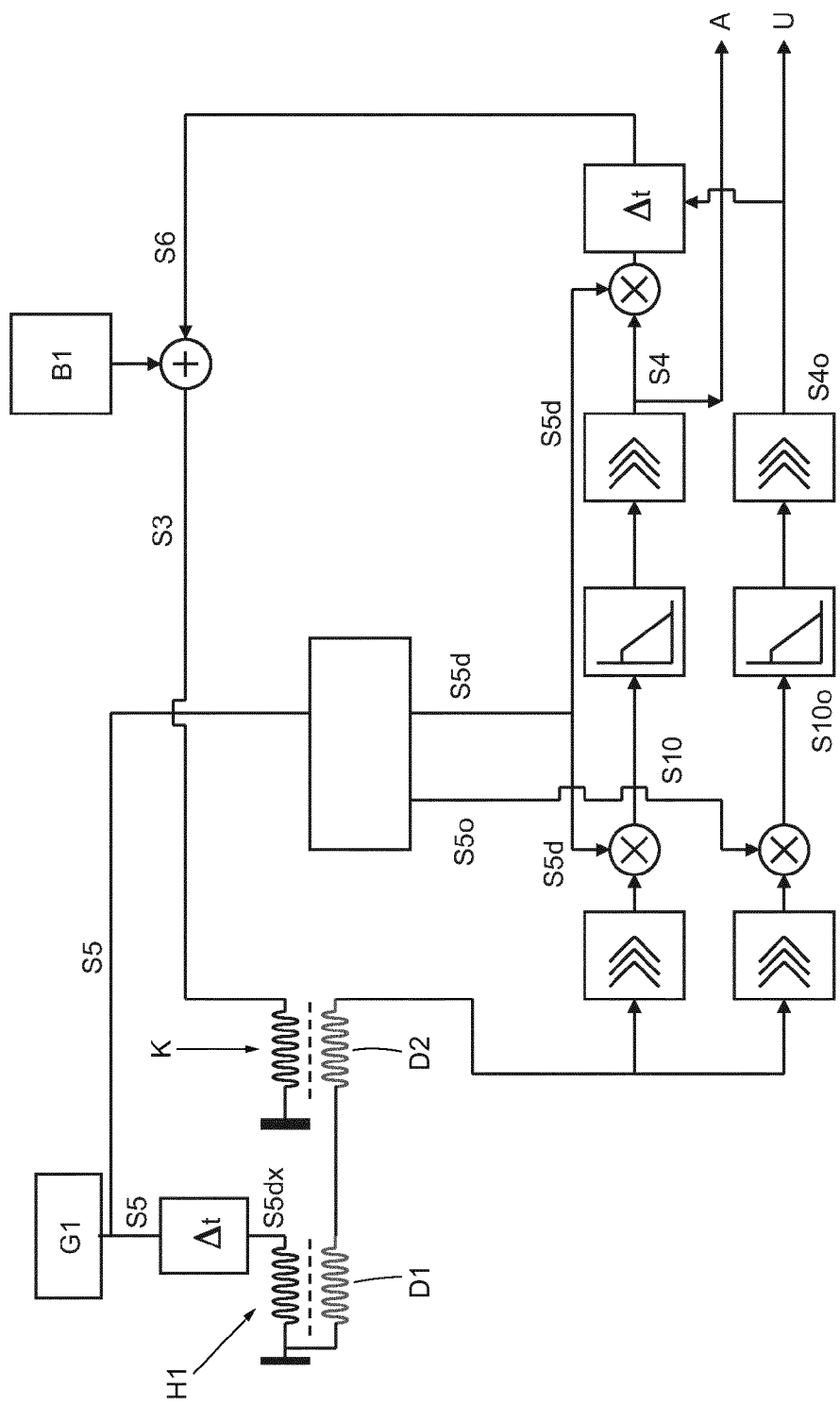

FIGS. 17$a$ and $b$ show a sensor system for measuring with electromagnetic waves—here based on TM modes, for example. For this purpose, a compensating magnetic antenna is used as the transmitter H1 and as the compensation transmitter K. The antennas have each integrated the receiving element, i.e., the receiver D1. Asymmetry can be detected when the signal S10 or the orthogonal signal S10$o$ is different from zero. Given an appropriate antenna design, this enables the measurement of metals (e.g., as inductive sensors) and the measurement of nuclear spin resonances.

FIG. 17$b$ shows the system from FIG. 17$a$ expanded by a delay element during the feeding of the transmitter H1. The compensating magnetic antenna is supplied with a supply signal S5$dx$ delayed by $\Delta t$, which opens up the possibility of a range switchover.

Figure 18:
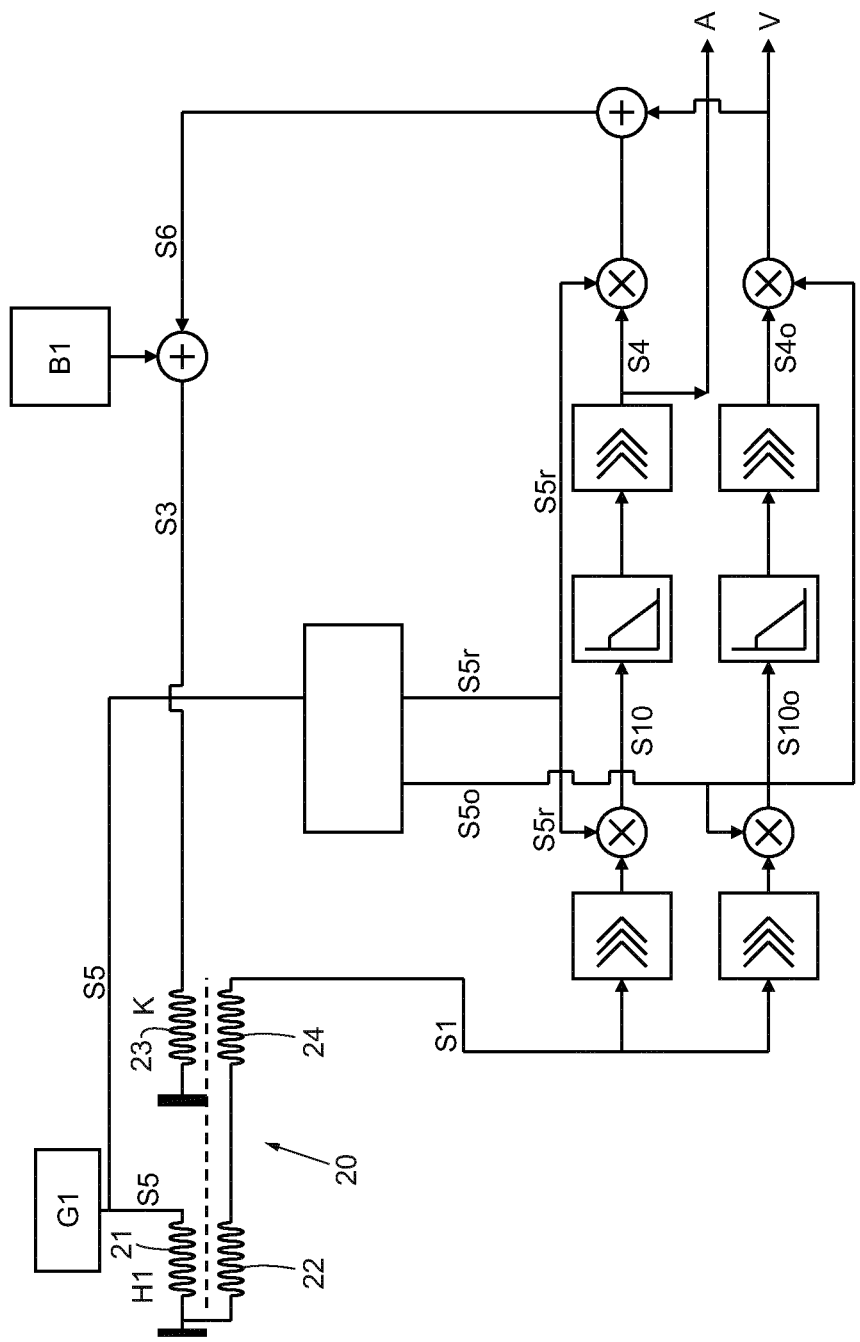
FIG. 18 shows a simplified diagram of a sensor system for measuring by means of compensated magnetic antennas.

FIG. 18 shows a measuring system according to this disclosure with a compensated four-spool magnetic antenna 20. The supply signal S5 is fed into a transmission coil 21. The latter couples inductively a first receiving coil 22 and, to a lesser extent, with a second receiving coil 24. The compensation signal S3 is fed into the compensation coil 23. The field of the compensation coil 23 couples strongly into the second receiving coil 24 and less strongly into the first receiving coil 22. The system is thus self-compensating, so that the signal S1 approaches zero.

Figure 19:
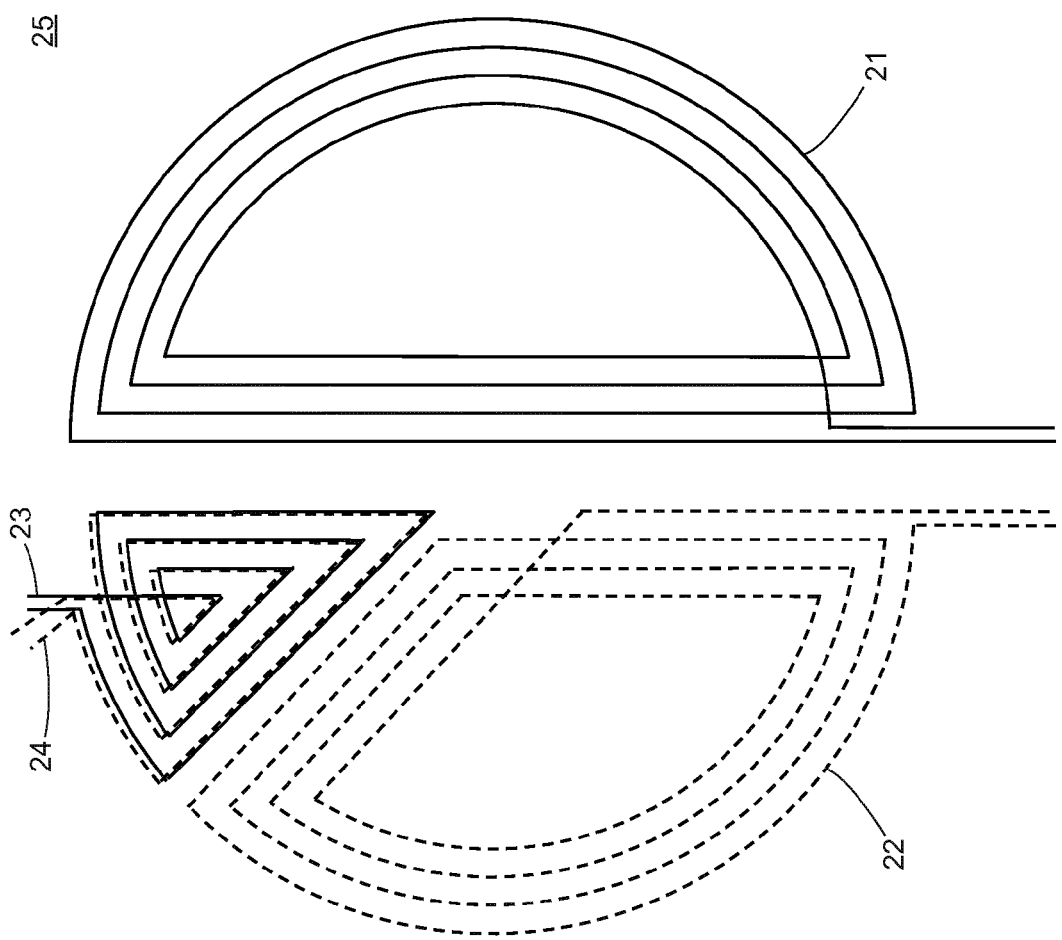
FIG. 19 shows a schematic view of an antenna from FIG. 18.

FIG. 19 shows an exemplary planar coil arrangement 25 for use on a two-sided circuit board. The following are drawn clockwise above: The transmission coil 21 of the signal S3, the first receiving coil 22 (dashed) and the second receiving coil 24 (dashed) that is superimposed with the transmission coil 23 for transmitting the compensation signal S3. The receiving coils 22, 24 are arranged on the reverse of the circuit board.

Figure 20:
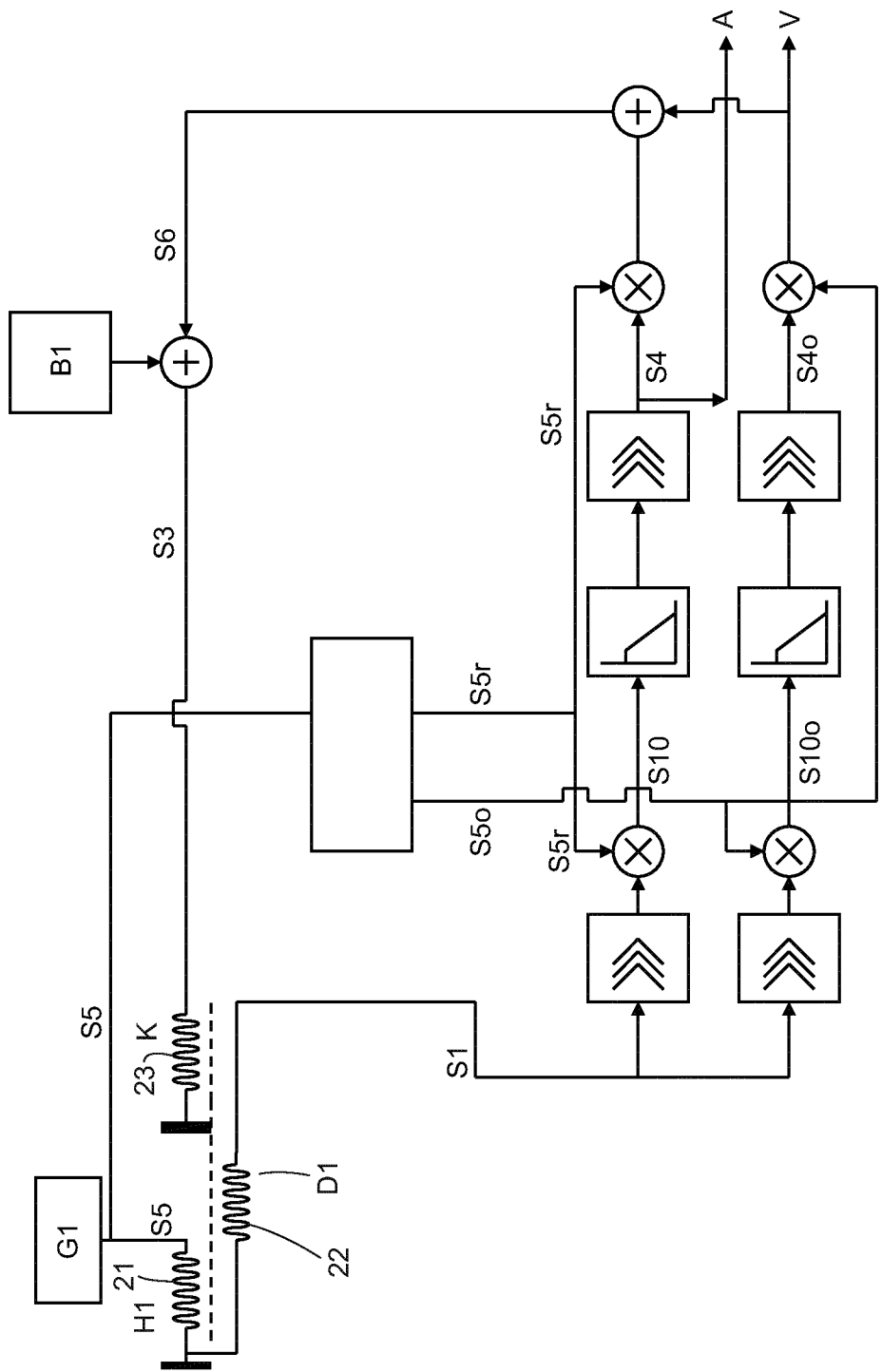
FIG. 20 shows a simplified diagram of a sensor system for measuring by means of a compensated magnetic antenna with three coils.

FIG. 20 shows a measuring system according to this disclosure with three coils. The two transmission coils 21, 23 couple into the same receiver coil 22.

Figure 21:
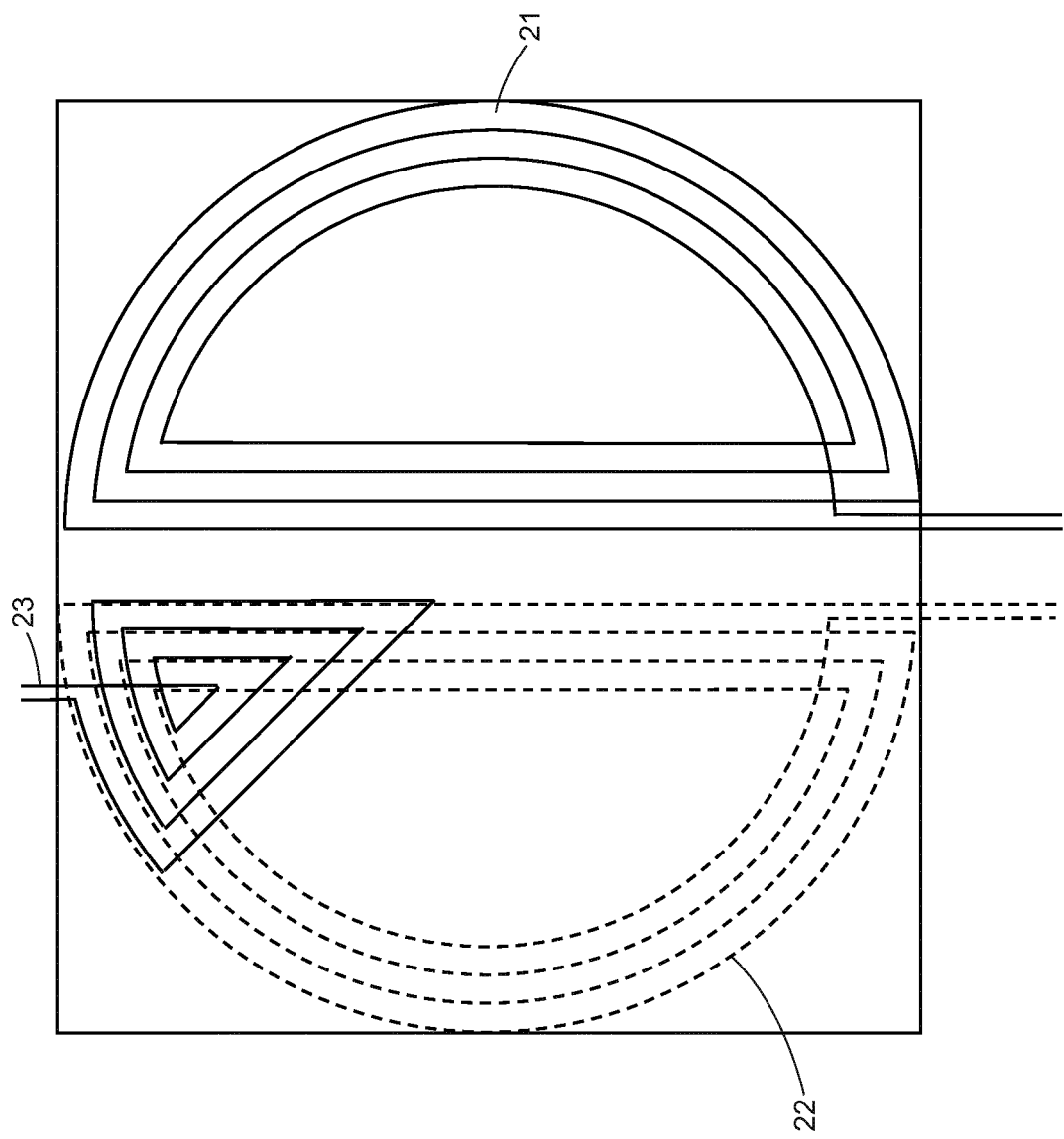
FIG. 21 shows a schematic view of an antenna from FIG. 20.

FIG. 21 shows a coil arrangement according to this disclosure for a measuring system according to FIG. 20. The following are drawn clockwise above: The transmission coil 21 for the signal S5 and the receiving coil 22 that is partially superimposed with the transmission coil 23 for the compensation signal S3.

Figure 22:
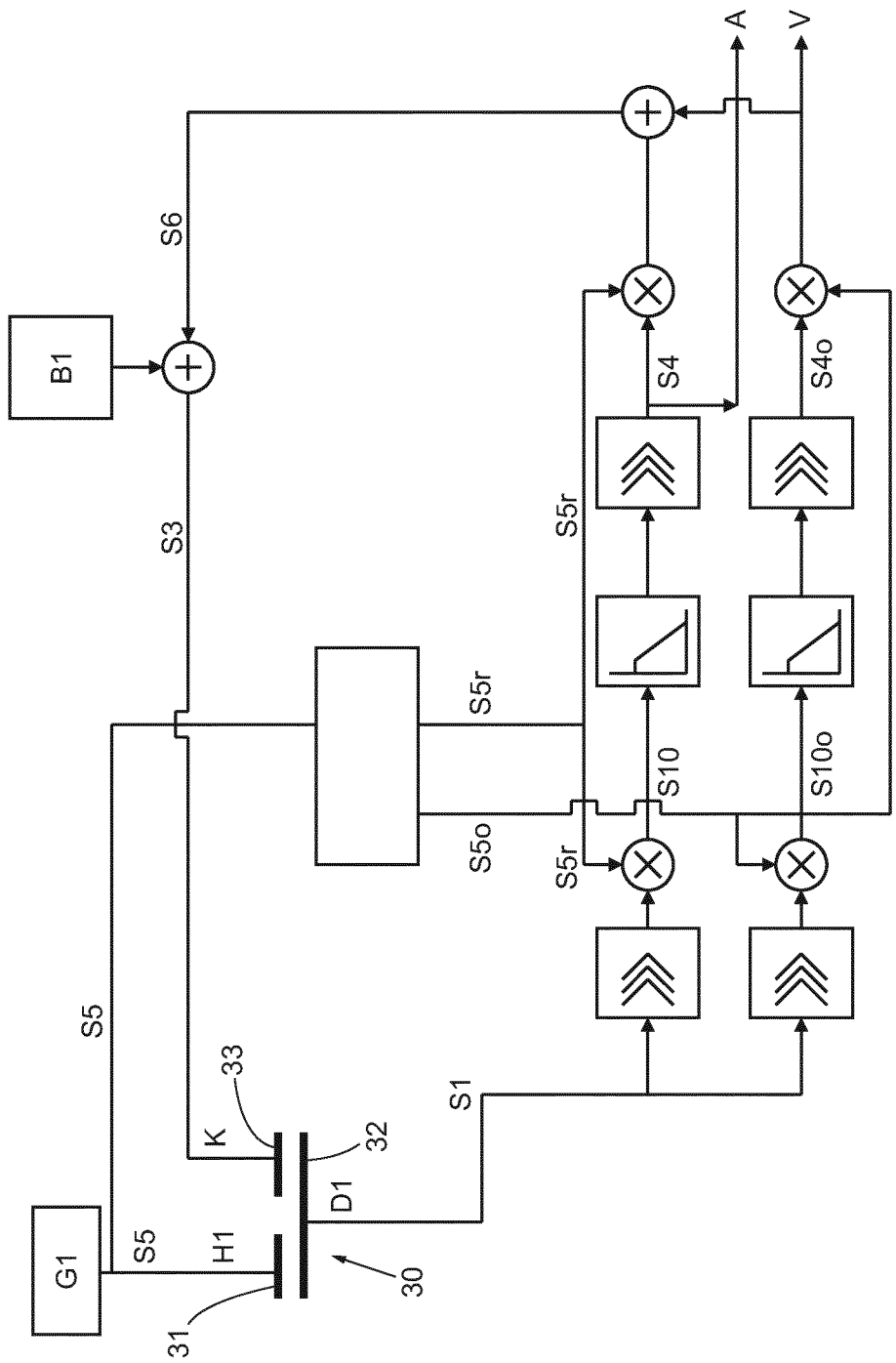
FIG. 22 shows a simplified diagram of a sensor system for measuring by means of a compensated electrostatic antenna.

FIG. 22 shows a measuring system according to this disclosure with a compensated electrostatic antenna 30 having three electrode surfaces. The supply signal S5 is fed into a transmitting electrode 31, which couples capacitively with a receiving electrode 32. The compensation signal S3 is fed into the compensation electrode 33. The field of the compensation electrode 33 also couples into the receiving electrode 32. The system is thus self-compensating, so that the signal S1 approaches zero.

It should be mentioned here that a wave-adjustment of the impedances of antennas, lines and output and input resistances of the circuits (for example, according to FIGS. 17 to 22) is typically expedient. The prior art does not address this problem. As a rule, measuring systems therefore cannot be produced and are consequently not economically exploitable.

Figure 23:
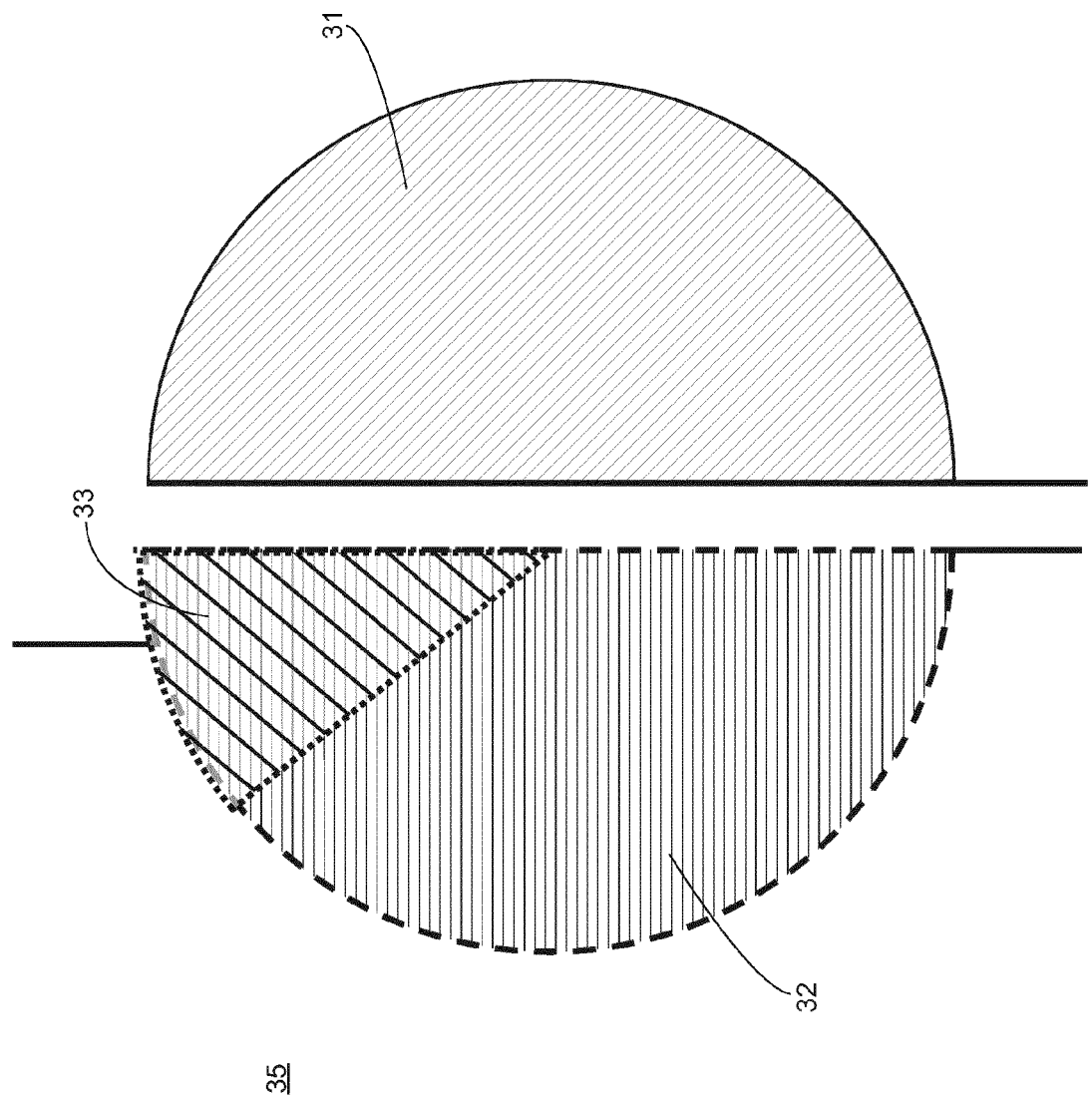
FIG. 23 shows a schematic view of an electrostatic antenna according to FIG. 22.

FIG. 23 shows an exemplary planar electrode arrangement 35 for use on a two-sided circuit board. The following are drawn clockwise above: The transmitting electrode 31 for the signal S5 and the receiving electrode 32 that is partially superimposed with the transmitting electrode 33 for the compensation signal S3.

Figure 24:
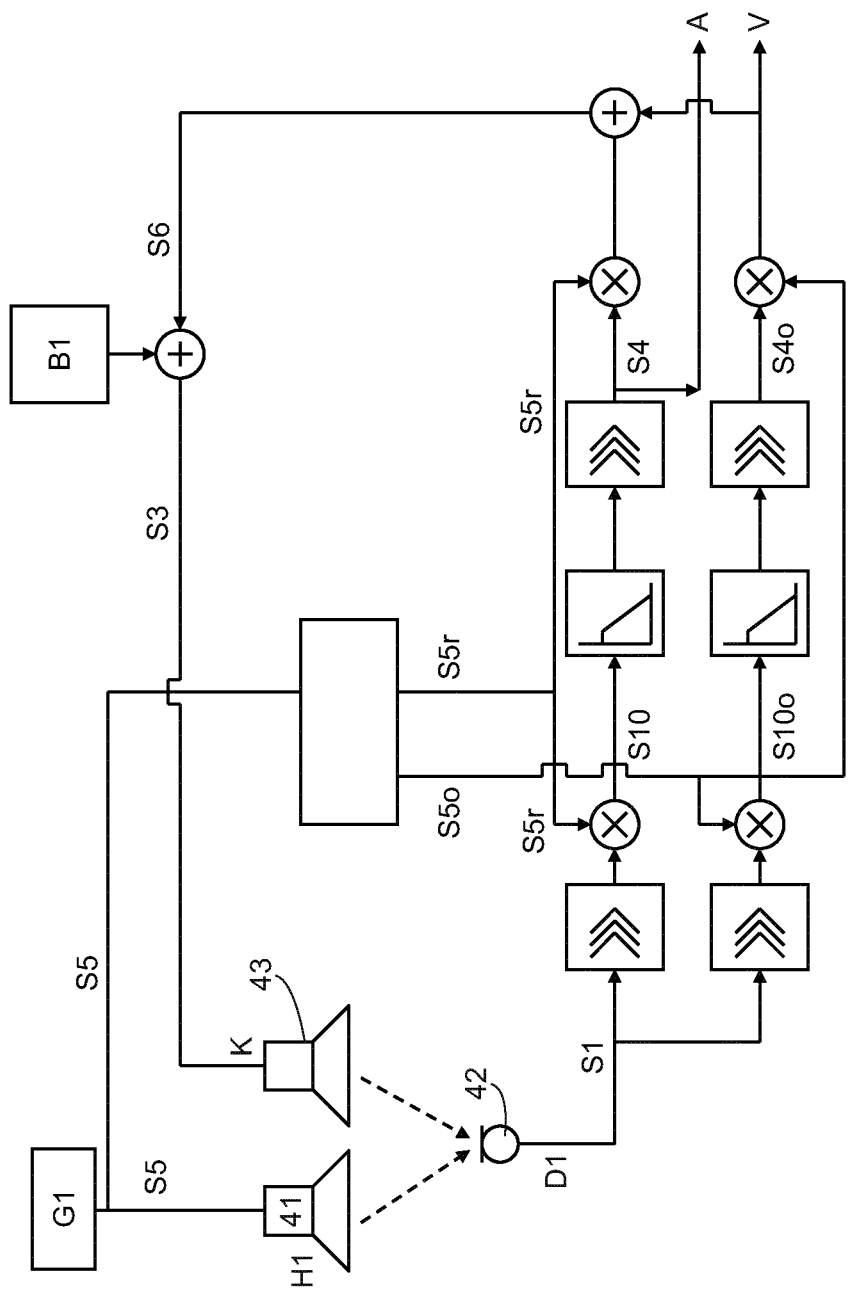
FIG. 24 shows a simplified diagram of a sensor system for measuring acoustic waves.

FIG. 24 shows a measuring system according to this disclosure with a compensated electroacoustic system having two loudspeakers 41, 43 and a microphone 42 as the receiver D1. The supply signal S5 is fed into a transmitting loudspeaker 41, which couples acoustically with the receiving microphone 42. The compensation signal S3 is fed into the compensation loudspeaker 43. The sound field of the compensation loudspeaker 43 also couples into the receiving microphone 42. The system is thus self-compensating, so that the signal S1 approaches zero.

It should also be mentioned here that an acoustic wave-adjustment of the acoustic impedances of loudspeakers, acoustic lines, etc., is typically expedient. The prior art does not address this problem. As a rule, measuring systems therefore cannot be produced and are consequently not economically exploitable.

A reference list of block pertaining elements shown in the drawings follows:
D1 Receiver
H1 Transmitter
G1 Generator
K Compensation Transmitter
J1 Interferer
PU Processing Unit
O Object
B1 Bias Generator
T1 Transmission Path
F Filter
V Amplifier
M1 Multiplier (multiplying element)

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for measuring the transmission properties of a first transmission path of a measuring system based on feedback compensation between a first transmitter and a receiver, the method comprising:
   transmitting, by the first transmitter, a first signal onto the first transmission path that is detected by the receiver after passing through the first transmission path;
   transmitting, by a compensation transmitter, a second signal onto a second transmission path that is detected by the receiver after passing through the second transmission path, wherein the first signal and the second signal are superimposed in a linear manner in the receiver and a receiver output signal is formed therefrom;
   generating, by a generator, a supply signal, wherein the supply signal and the receiver output signal each form a vector in a pre-Hilbert space and the supply signal is a band-limited supply signal different from zero that has an upper cutoff frequency $\omega_{max}$ and a lower cutoff frequency $\omega_{min}$, the lower cutoff frequency $\omega_{min}$ being different from the upper cutoff frequency $\omega_{max}$;
   feeding the supply signal to the first transmitter;
   executing a forward transformation through a Hilbert projection from the receiver output signal of the receiver to the supply signal to generate a projection image signal;
   generating an output signal based on the projection image signal, wherein the output signal comprises information about the transmission properties of the first transmission path;
   executing at least partial inverse transformation of the output signal with the supply signal such that a pre-signal is formed;
   generating a compensation signal from the pre-signal; and
   feeding the compensation signal to the compensation transmitter for the feedback control of the receiver output signal.

2. The method as set forth in claim 1, wherein the supply signal is a modulated or non-clocked signal.

3. The method as set forth in claim 1, wherein the supply signal is a random signal, a pseudo-random signal, a signal based on a spread code or a noise signal.

4. The method as set forth in claim 1, wherein the inverse transformation is a multiplication of the Hilbert projection done through the transformation of a scalar product by:
   multiplying the receiver output signal by the supply signal to generate a detection signal; and filtering the detection signal by a filter to generate a filtered output signal, so that the projection image signal is generated from the filtered output signal.

5. The method of claim 4, wherein the filter is a linear filter that allows frequencies to pass through that are less than or equal to half the distance between the upper cutoff frequency $\omega_{max}$ and the lower cutoff frequency $\omega_{min}$ of the supply signal.

6. The method as set forth in claim 4, wherein the supply signal and the filter are selected such that, when filtering an interference signal that is scalar-multiplied by the supply signal, the filtered output signal is minimal.

7. The method as set forth in claim 4, further comprising measuring the filtered output signal to identify an interference signal in the receiver output signal.

8. The method as set forth in claim 1, further comprising amplifying the projection image signal by an amplifier.

9. The method as set forth in claim 1, further comprising generating a bias value, wherein the generating of the compensation signal comprises addition of the pre-signal with the bias value.

10. The method as set forth in claim 9, further comprising adding the bias value to the supply signal before feeding the supply signal to the first transmitter.

11. The method as set forth in claim 1, wherein the lower cutoff frequency $\omega_{min}$ of the supply signal is greater than half the upper cutoff frequency $\omega_{max}$ of the supply signal.

12. The method as set forth in claim 1, further comprising generating a base signal that is orthogonal to the supply signal, the orthogonal base signal being generated from the difference of a signal preceding the supply signal by a time period $\Delta t$ and a signal trailing the supply signal by the time period $\Delta t$ or the difference of the supply signal and a signal trailing the supply signal by the time period $\Delta t$.

13. The method as set forth in claim 1, further comprising:
generating a bias value;
generating a base signal that is orthogonal to the supply signal;
generating a scalar product from the receiver output signal and the orthogonal base signal to generate an orthogonal projection image signal;
amplifying, by an amplifier, the orthogonal projection image signal to an orthogonal output signal;
multiplying the orthogonal output signal by the orthogonal base signal to generate an orthogonal pre-signal; and
adding the orthogonal pre-signal with the pre-signal, the compensation signal being generated through the addition of the pre-signal with the orthogonal pre-signal and the bias value.

14. The method as set forth in claim 13, wherein generating the scalar product from the receiver output signal and the orthogonal base signal comprises:
multiplying the receiver output signal by the orthogonal base signal to generate an orthogonal detection signal; and
filtering the orthogonal detection signal by a filter.

15. The method as set forth in claim 14, further comprising the following steps:
generating a first pulse trailing the supply signal by a first time period $\Delta t_1$, generating a second pulse trailing by a second time period $\Delta t_2$, and generating a third pulse trailing by a third time period $\Delta t_3$, the second time period $\Delta t_2$ being greater than the first time period $\Delta t_1$, and the third time period $\Delta t_3$ being greater than or equal to the second time period $\Delta t_2$;

generating an orthogonal first base signal from the supply signal;
generating an orthogonal second base signal that is orthogonal to the orthogonal first base signal, wherein,
a. the orthogonal first base signal can be generated as the difference of the first pulse and the second pulse;
b. the orthogonal first base signal can be identical to the first pulse;
c. the first time period can be $\Delta t_1=0$; and
d. the second and third time periods $\Delta t_2$ and $\Delta t_3$ can be equal;
further processing the orthogonal first base signal into an orthogonal first pre-signal;
further processing the orthogonal second base signal into an orthogonal second pre-signal; and
generating, from the pre-signal, the orthogonal first pre-signal and the orthogonal second pre-signal, the compensation signal that is fed to the compensation transmitter.

16. The method as set forth in claim 13, further comprising:
generating multiple orthogonal base signals;
generating multiple orthogonal pre-signals; and
adding at least one of the orthogonal pre-signals to the pre-signal and the bias value using several amplifiers.

17. The method as set forth in claim 16, wherein at least two of the orthogonal base signals that are orthogonal to the supply signal are orthogonal to each other.

18. The method as set forth in claim 13, wherein the output signal or the orthogonal output signal is processed and outputted as a measured value.

19. The method as set forth in claim 1, further comprising the following steps:
generating an orthogonal base signal that is orthogonal to the supply signal;
generating a scalar product from the receiver output signal and the orthogonal base signal to generate an orthogonal projection image signal;
amplifying, by an amplifier, the orthogonal projection image signal to an orthogonal output signal; and
processing the receiver output signal as a function of the orthogonal output signal and delaying the processing chain of the receiver output signal to the compensation signal by delaying:
a. the supply signal that is used for the at least partial inverse transformation, and
b. the pre-signal during the at least partial inverse transformation.

20. The method as set forth in claim 1, wherein the first transmitter is controlled by a signal that is delayed with respect to the supply signal.

21. The method as set forth in claim 20, further comprising:
generating a base signal that is orthogonal to the supply signal;
generating a scalar product from the receiver output signal and the orthogonal base signal to generate an orthogonal projection image signal;
generating, by an amplifier, an orthogonal output signal through amplification of the orthogonal projection image signal;
generating a delayed supply signal by delaying the supply signal as a function of the orthogonal output signal; and
feeding the first transmitter with the delayed supply signal.

22. The method as set forth in claim 21, wherein the supply signal is a clocked or monofrequent signal, and generating the delayed supply signal is phase-shifted by delaying the supply signal.

23. The method as set forth in claim 1, wherein the supply signal is generated with a random generator or a quasi-random generator comprising a feedback shift register and the supply signal being generated from a simple polynomial generator.

24. The method as set forth in claim 1, further comprising generating multiple trailing signals each shifted by a time period Δt with respect to the supply signal and thereby detecting an object arranged in the first transmission path.

25. A sensor system, comprising:
a first transmitter, a compensation transmitter and a receiver for measuring transmission properties of a first transmission path between the first transmitter and the receiver, wherein the first transmitter is configured to receive a supply signal from a generator and transmit a first signal to the receiver through the first transmission path;
wherein the compensation transmitter is configured to transmit a second signal to a second transmission path that is detected by the receiver, and wherein the supply signal and a receiver output signal of the receiver each form a vector in a pre-Hilbert space;
a processing unit configured to perform a forward transformation through a Hilbert projection of the receiver output signal of the receiver to the supply signal to generate a projection image signal; and
an amplifier configured to amplify the projection image signal and to generate a return signal to the processing unit, wherein an inverse transformation of the return signal with the supply signal occurs in the processing unit, the return signal and the supply signal are multiplied, and a pre-signal is formed that is further processed into a compensation signal that is supplied to the compensation transmitter to create a feedback control of the receiver output signal.

26. The sensor system as set forth in claim 25, wherein:
the processing unit comprises a filter;
the processing unit is configured to produce the Hilbert projection through formation of a scalar product in which the receiver output signal is multiplied by the supply signal to generate a detection signal; and
wherein the filter is configured to filter the detection signal to generate the projection image signal.

27. The sensor system as set forth in claim 25, further comprising:
a plurality of generators configured to generate supply signals;
a plurality of first transmitters each of which is supplied with one of the supply signals; and
a plurality of transmission paths through which a respective transmission signal of one of the first transmitters is transmitted to the receiver;
wherein the receiver is configured to superimpose the first signals of the first transmitters with the second signal of the compensation transmitter to the receiver output signal.

28. The sensor system as set forth in claim 25, wherein:
the sensor system further comprises multiple receivers and multiple compensation transmitters, each one of the multiple compensation transmitters being associated with a respective one of the multiple receivers;
a plurality of transmission paths is formed and the first transmitter is configured to transmit the first signal to a respective receiver through the plurality of transmission paths; and
the first signal of the first transmitter is superimposed in each of the multiple receivers with a respective second signal of a respective compensation transmitter to the receiver output signal.

29. The sensor system as set forth in claim 25, wherein:
the sensor system further comprises several receivers and at least one compensation transmitter being associated in common with at least two of the several receivers;
a plurality of transmission paths is formed through which the transmission signal of the first transmitter is transmitted to a respective receiver;
the first signal of the first transmitter is superimposed in each receiver with a respective second signal of the compensation transmitter into the receiver output signal; and
a plurality of compensation signals is formed by respectively switching back and forth in a time division multiplex between the receiver output signals.

30. The sensor system as set forth in claim 25, wherein the signal transmission of the first signal through the first transmission path between the first transmitter and the receiver occurs electronically, capacitively, inductively, electromagnetically, through transmission of electrical current, through transmission of electrical voltage, through transmission of electrical or thermal power, acoustically, fluidly, pneumatically, hydraulically or through changing of the physical or chemical properties of a moving medium.

31. The sensor system as set forth in claim 25, wherein the sensor system is configured to detect at least one of the following variables of properties of transmission path or of objects or media in transmission path: refractive indexes, object density, object size, object distance, object composition, position of object in space, object orientation, transparency or transmission, attenuation or absorption, reflectivity or reflection, phase delay, nuclear spin interactions, permeabilities dielectric values, conductivities, resistances or resistance distributions, and velocity distributions.

* * * * *